US011648880B1

(12) United States Patent
Roise et al.

(10) Patent No.: US 11,648,880 B1
(45) Date of Patent: May 16, 2023

(54) BARBECUE GRILL WITH DOCKING PLATE

(71) Applicants: Jondavid George Roise, Menoken, ND (US); Anton Charles Roise, Bismark, ND (US)

(72) Inventors: Jondavid George Roise, Menoken, ND (US); Anton Charles Roise, Bismark, ND (US)

( * ) Notice: Subject to any disclaimer, the term of this patent is extended or adjusted under 35 U.S.C. 154(b) by 209 days.

(21) Appl. No.: 16/211,210

(22) Filed: Dec. 5, 2018

Related U.S. Application Data

(60) Provisional application No. 62/594,589, filed on Dec. 5, 2017.

(51) Int. Cl.
*A47J 37/06* (2006.01)
*B60R 7/00* (2006.01)
*B60R 11/00* (2006.01)

(52) U.S. Cl.
CPC ............ *B60R 7/00* (2013.01); *A47J 37/0676* (2013.01); *B60R 11/00* (2013.01)

(58) Field of Classification Search
CPC ......... B60R 7/00; B60R 11/00; A47J 37/0676
See application file for complete search history.

(56) References Cited

U.S. PATENT DOCUMENTS

| | | | | | |
|---|---|---|---|---|---|
| 4,463,746 | A | * | 8/1984 | Knuth | A47J 37/0763 126/25 R |
| 6,314,870 | B1 | * | 11/2001 | Staller | A47J 37/067 428/457 |
| 7,053,337 | B2 | * | 5/2006 | Ragan | A47J 37/0611 126/275 R |
| 10,022,016 | B1 | * | 7/2018 | Streett | B60P 3/36 |
| 2010/0139642 | A1 | * | 6/2010 | Pliml | A47J 37/0704 126/25 R |
| 2012/0125323 | A1 | * | 5/2012 | Goeken | A47J 37/0713 126/9 R |
| 2017/0159941 | A1 | * | 6/2017 | Kahler | F24C 15/26 |

FOREIGN PATENT DOCUMENTS

EP     0054825 A1 *  6/1982  ........... B62D 33/037

* cited by examiner

*Primary Examiner* — Steven B McAllister
*Assistant Examiner* — Aaron H Heyamoto
(74) *Attorney, Agent, or Firm* — Rick B. Yeager

(57) ABSTRACT

A barbecue grill configured to be removably attached to a docking mechanism which is supported by a pickup truck bed. A heat resistant docking plate that is configured to be attached to a vehicle tailgate, and allows the user to nest, lock and carry the grill in the back of the pickup bed. The grill includes a lid, a grate, burners, and burner covers which may be locked for transport to reduce rattle, and burners which are secured to the grill body. A double wall with stainless steel interior and aluminum exterior is provided to permit the grill to get hotter on the inside without dissipating as much heat. A removable drip pan with a large reservoir is provided in order to contain drippings during device transport.

14 Claims, 31 Drawing Sheets

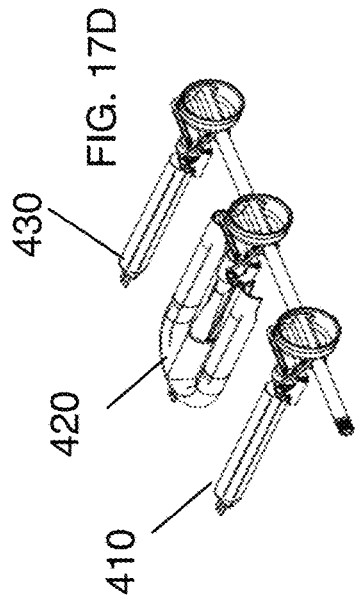
FIG. 17B
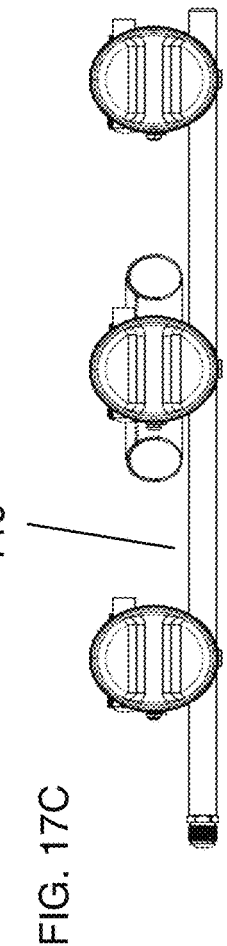
FIG. 17D
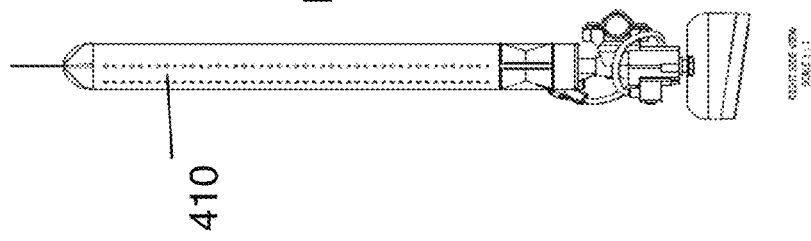
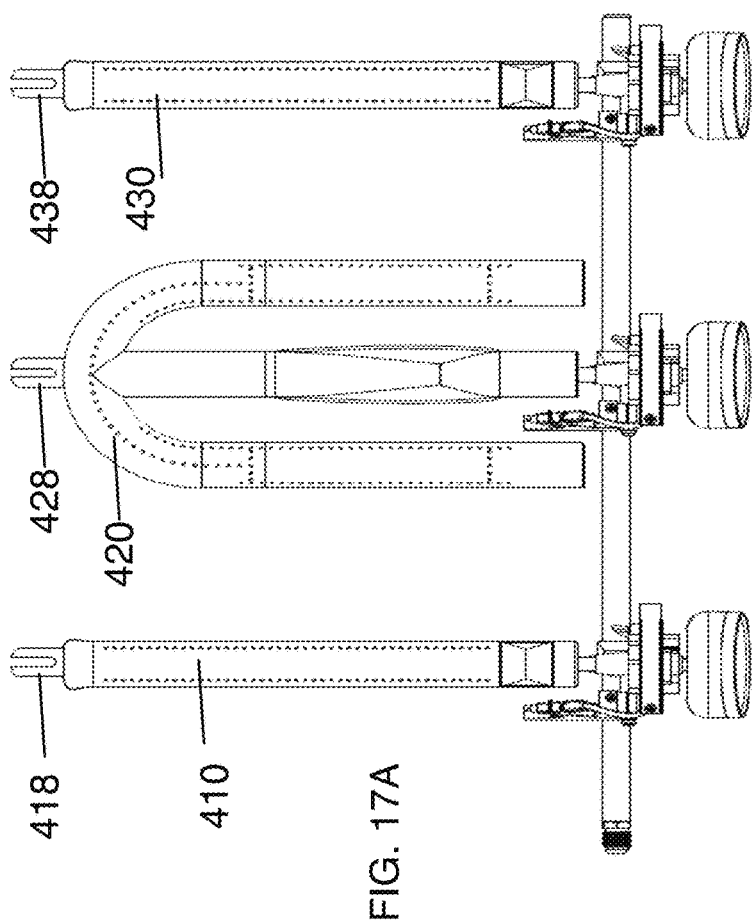
FIG. 17A
FIG. 17C

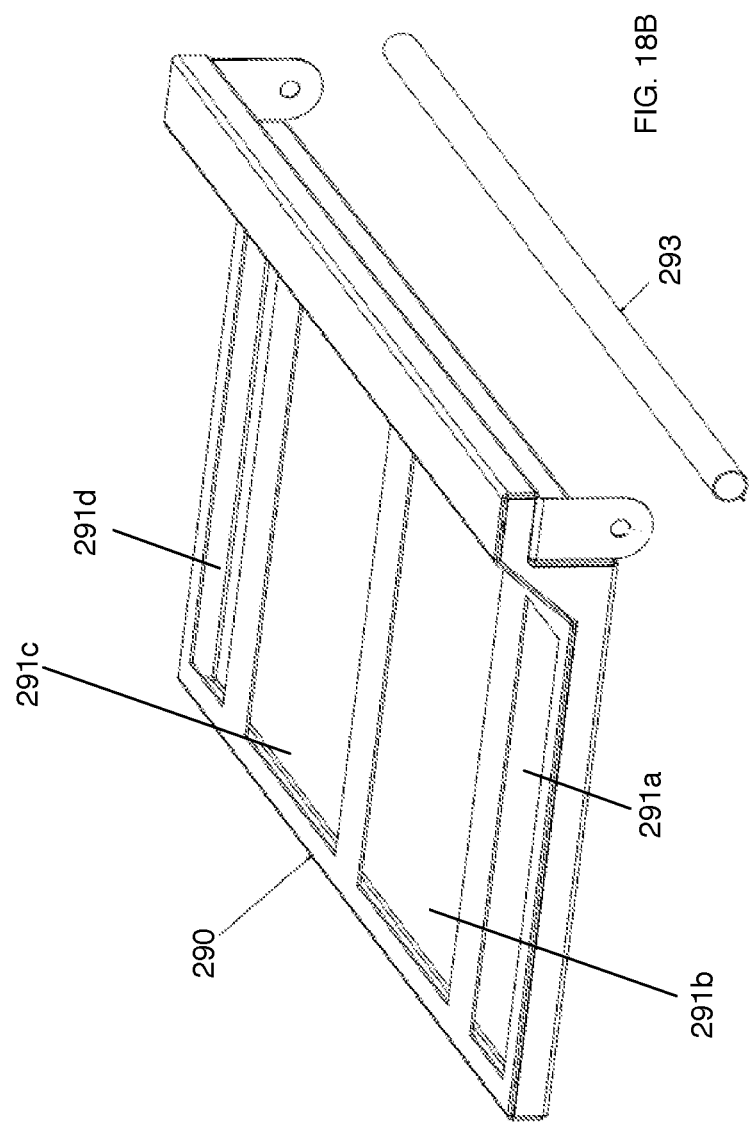

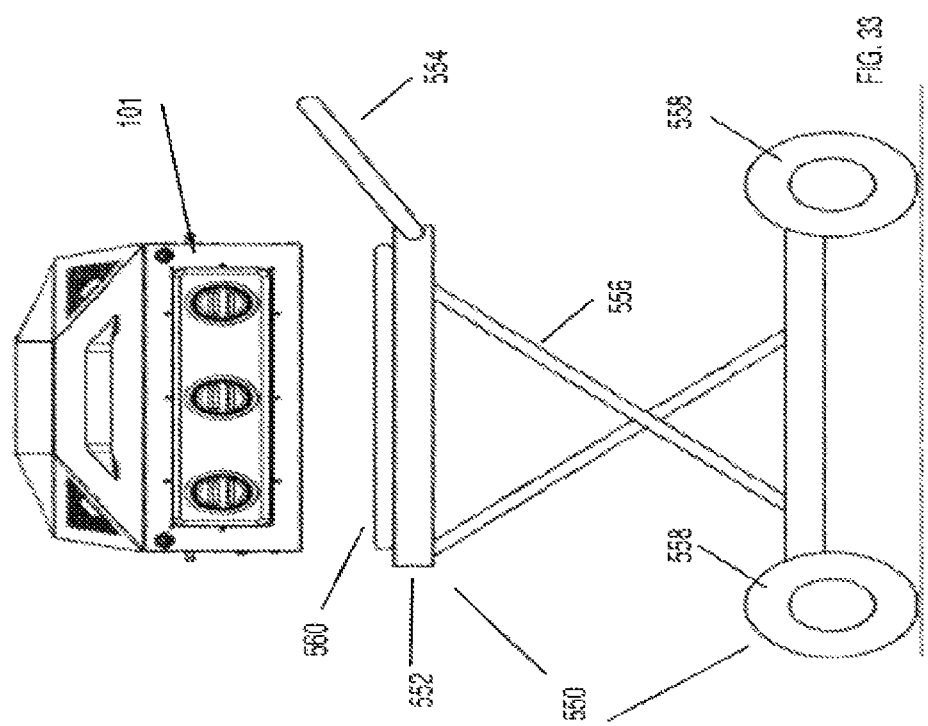

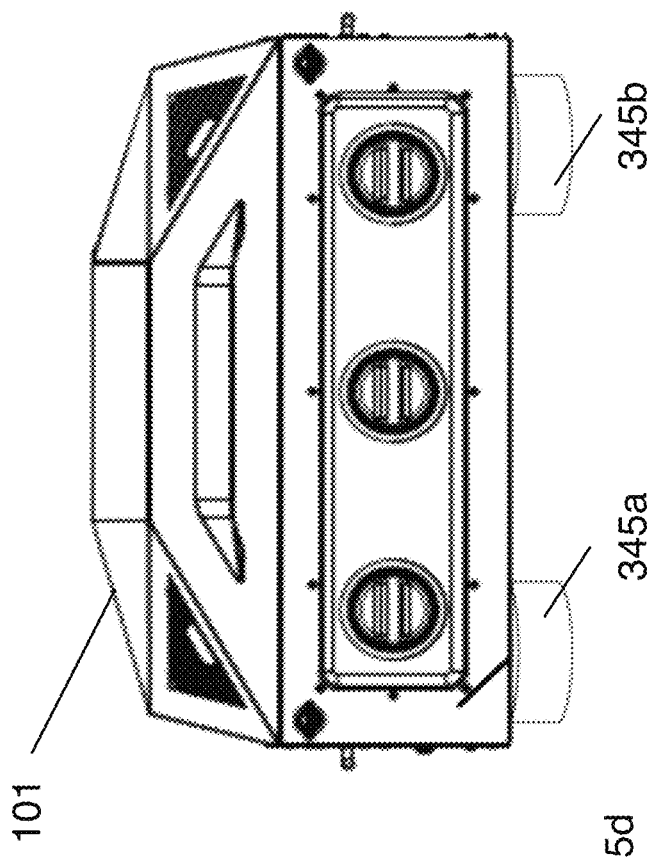
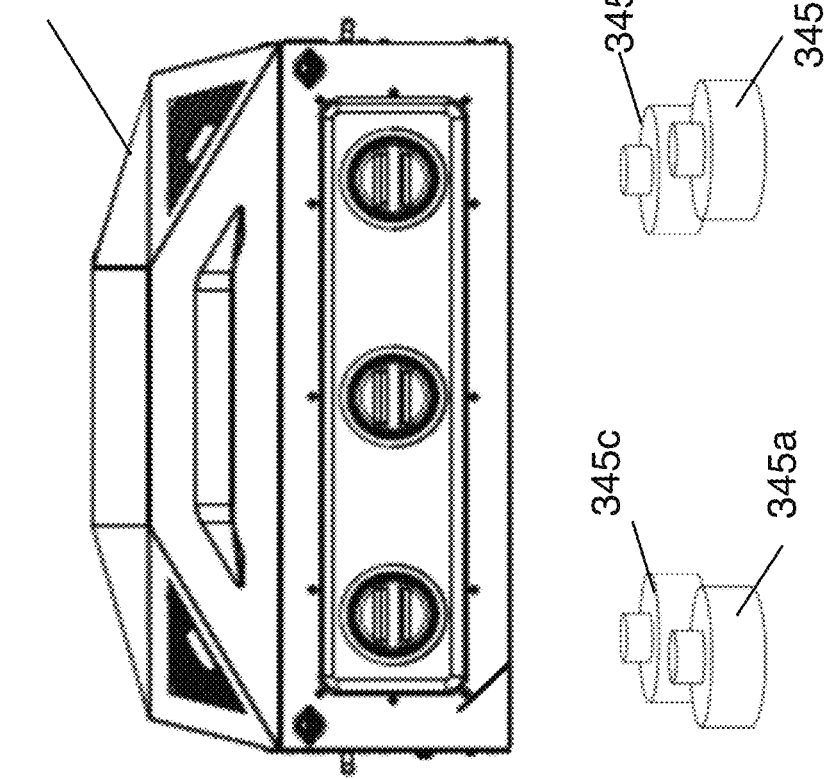
FIG. 34A
FIG. 34B

BARBECUE GRILL WITH DOCKING PLATE

RELATED APPLICATIONS

This US non-provisional application is related to U.S. Provisional Patent Application No. 62/594,589 filed Dec. 5, 2017 by applicants, and claims the priority date of that provisional application.

BACKGROUND

Field of Invention

The current invention relates to a barbecue grill, and more particularly to a grill which is configured to be removably attached to a docking mechanism which is supported by a pickup truck bed.

Prior Art

The prior art includes various barbecue grill devices that are configured to be permanently or removably supported by portions of a vehicle.

U.S. Pat. No. 8,776,778 to Brown (FIG. 1) describes a tailgate barbeque grill for use in the bed of a pickup truck. The grill slides along rails and is stored in the front portion thereof for transport and is positioned in the rear portion and lowered for use.

United States Patent Application 20160348922 to Knight (FIG. 2) describes a portable grill adapted to be supported by a hitch of a vehicle is provided so that the portable grill is disposed outside the vehicle during use and transportation so as to not take up important storage space in the transporting vehicle. The portable grill may include a body pivotally connected to a cooperating lid so as to define a grilling space. The components of the portable grill may be made of 10 gauge steel metal and rigidly interconnected by welds to provide sufficient operable durability. Specifically, the body may provide a rigidly connected lower frame assembly having a hitch tube dimensioned and adapted to securely mount the body to the hitch of vehicle during transport and use.

United States Patent Application 20090174212 (FIG. 3) to Donoho et al. describes a system is for integrating a cooking device, such as a barbeque, into the tailgate portion of a pick-up truck or other automobile. When the tailgate is folded down to the open position, covers can be opened which expose the contained cooking device. When in the stowed position, the device approximates the appearance of the original vehicle tailgate. The system includes a battery pack for electrically powering the cooking device and/or receiving power from the vehicle electrical system or other external supply. A curved removable drip pan which is shaped to maximize usable volume is provided for catching and discarding grease from the device. The system may be supplied as a retrofit within an existing vehicle tailgate or as a direct replacement for the original factory-supplied tailgate.

SUMMARY

In one embodiment, a barbecue grill is configured to be removably attached to a heat resistant the docking plate that is configured to be attached to a vehicle tailgate. The docking plate allows the user to nest, lock and carry the grill in the back of the pickup bed for convenient transportation and use. The docking plate is configured to attach to most standard tailgates.

In another embodiment, a barbecue grill has one or more feet which are configured to be removably attached to feet receptacles attached to a vehicle tailgate.

In one example, the barbecue grill includes a lid, a grate, burners, and burner covers which may be locked for transport to reduce rattle, and burners which are secured to the grill body. A double wall with stainless steel interior and aluminum exterior is provided to permit the grill to get hotter on the inside without dissipating as much heat. A removable drip pan with a large reservoir is provided in order to contain drippings during device transport. In another example, the grill has a stainless steel interior and exterior.

BRIEF DESCRIPTION OF THE DRAWINGS

FIG. 4 is a front perspective view of an embodiment of a barbeque grill with a docking plate.

FIG. 5 is a front view of the barbeque grill with a docking plate of FIG. 4.

FIG. 6 is a side view of the barbeque grill with a docking plate of FIG. 4.

FIG. 7 is a top view of the barbeque grill with a docking plate of FIG. 4.

FIG. 8 is a front perspective view of the barbeque grill with a docking plate of FIG. 4 with the cover open.

FIG. 9 is a front perspective view of the barbeque grill with a docking plate of FIG. 4 with the cover open and the grate partially raised.

FIG. 10 is a side perspective view of the barbeque grill with a docking plate of FIG. 4 with the cover open and the grate partially raised.

FIG. 11 is a top perspective view of the docking plate of the barbeque grill of FIG. 4.

FIG. 12 is a front view of the docking plate of FIG. 11.

FIG. 13 is a top view of the docking plate of FIG. 11.

FIGS. 14A-28 show a second embodiment of a barbeque grill with a docking plate FIG. 14A is a left front perspective view of a second embodiment of a grill.

FIG. 14B is a right front perspective view of the grill of FIG. 14A.

FIG. 14C is a left side view of the grill of FIG. 14A.

FIG. 14D is a top view of the grill of FIG. 14A.

FIG. 14E is a front view of the grill of FIG. 14A.

FIG. 14F is a right view of the grill of FIG. 14A.

FIG. 14G is a rear view of the grill of FIG. 14A.

FIG. 15 is an exploded view of the grill of FIG. 14A.

FIG. 16 is an exploded view of the internal components of the grill of FIG. 14A.

FIG. 17A is a top view of the burner assembly of the grill of FIG. 14A.

FIG. 17B is a side view of the burner assembly of the grill of FIG. 14A.

FIG. 17C is a front view of the burner assembly of the grill of FIG. 14A.

FIG. 17D is a front perspective view of the burner assembly of the grill of FIG. 14A.

FIG. 18B is an exploded view of the drip pan of the grill of FIG. 14A.

FIG. 19 is an exploded view of a handle assembly of the grill of FIG. 14A.

FIG. 20 is an exploded view of the base plate of the grill of FIG. 14A.

FIG. 21 is an exploded view of a lid assembly of the grill of FIG. 14A.

FIG. 22 is a partial front perspective view of the grill of FIG. 14A.

FIG. 23 is a partially exploded detailed front perspective view of a first example foot of the grill of FIG. 14A.

FIG. 24 is detailed side cross section view of a second example foot of the grill of FIG. 14A.

FIG. 25 is top perspective view of a portion of a docking plate of the grill of FIG. 14A.

FIG. 26 is bottom perspective view of a portion of a docking plate lock of FIG. 25.

FIG. 27 is a front view of the docking plate lock of FIG. 26.

FIG. 28 is a rear perspective view of the rear panel for the grill of FIG. 14.

FIG. 33 is a side view of a grill positioned for support on a cart.

FIG. 34A is a side view of a grill positioned for support by a plurality of docking feet.

FIG. 34B is a side view of a grill of FIG. 34A positioned on the plurality of docking feet.

DETAILED DESCRIPTION

Figure 1:
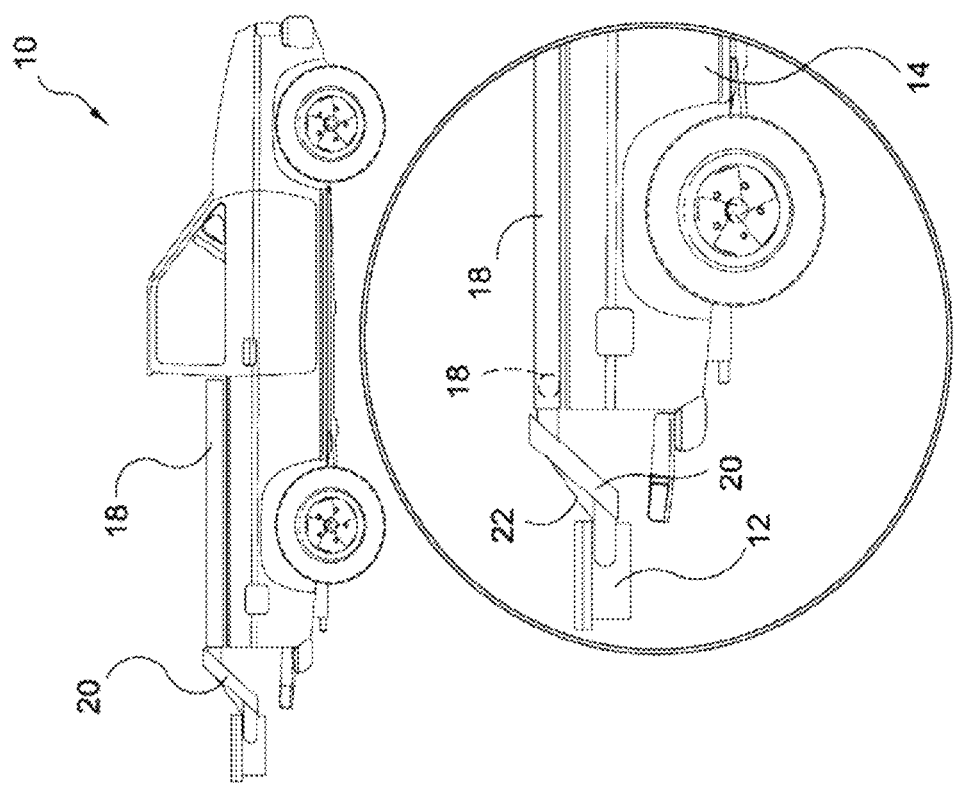
FIG. 1 (PRIOR ART) shows a grill mounted along rails.
Figure 2:
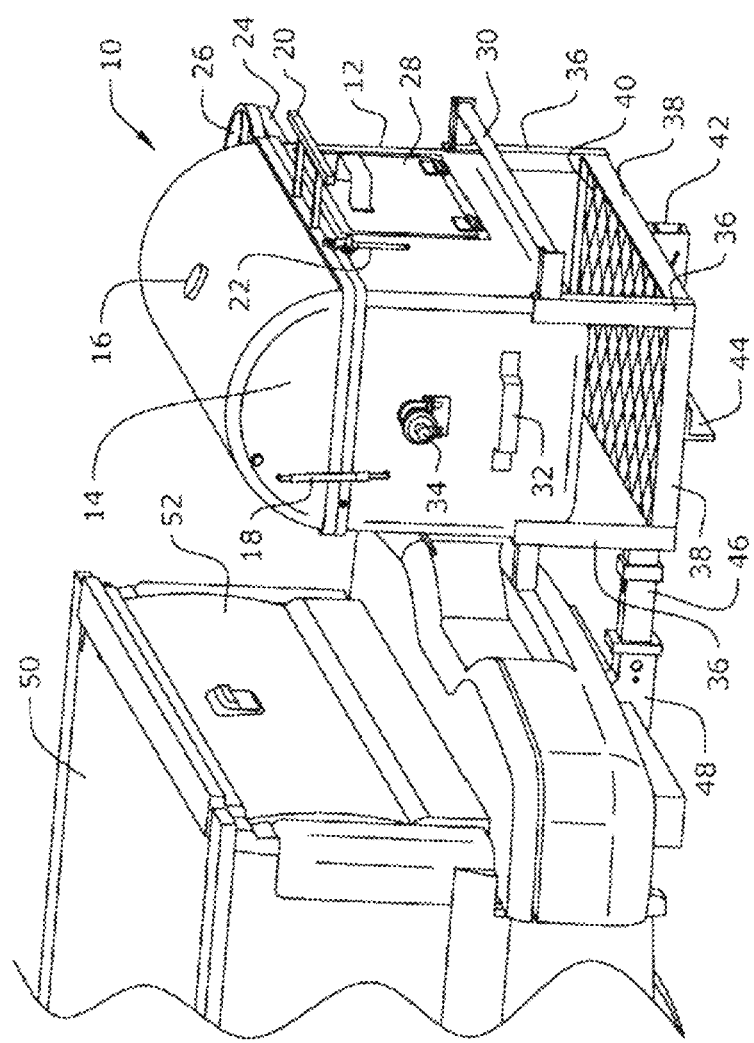
FIG. 2 (PRIOR ART) shows a portable grill supported by the hitch of a vehicle.
Figure 3:
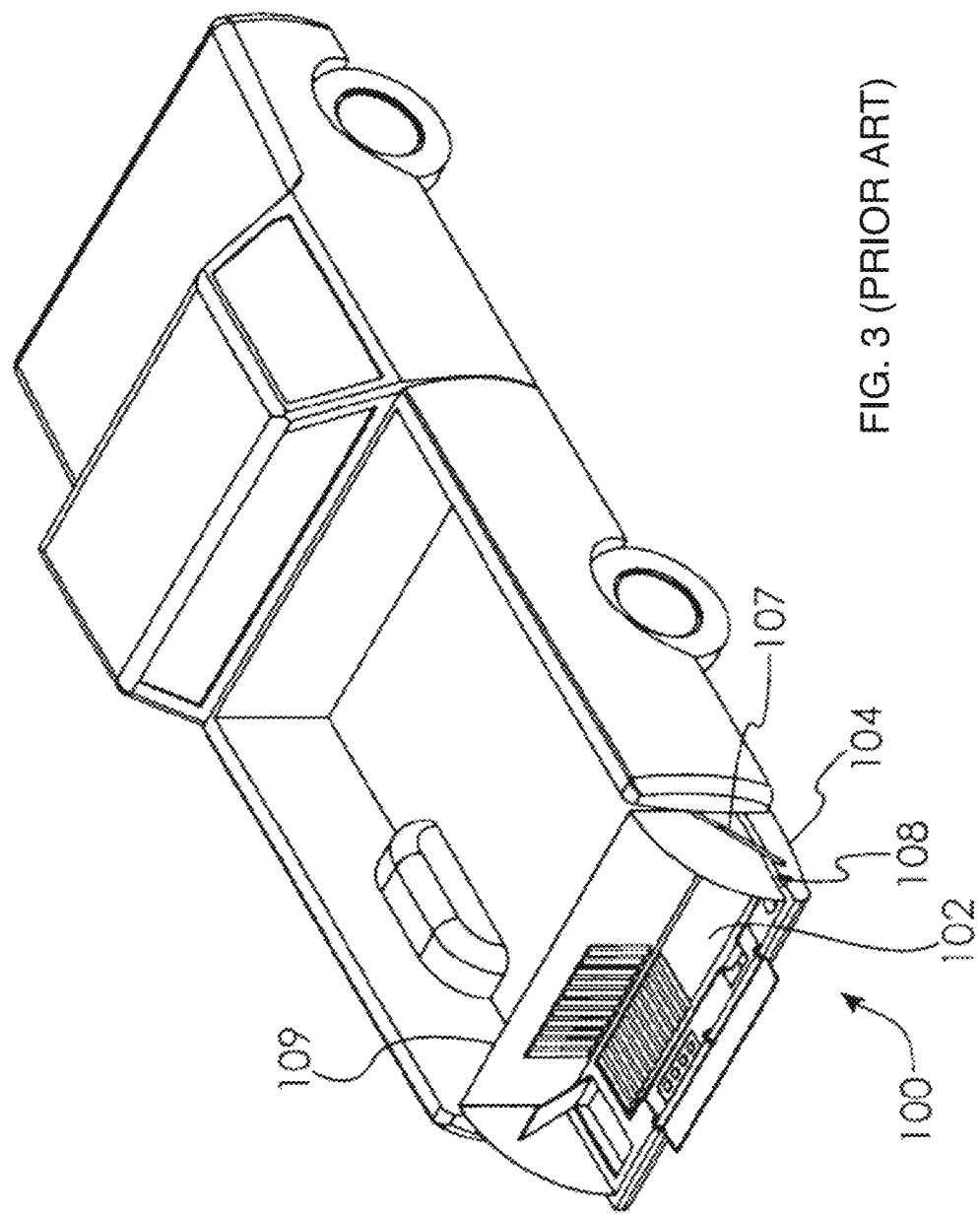
FIG. 3 (PRIOR ART) shows a cooking device integrated into a tailgate.

The following list of elements is provided for convenience in reviewing FIGS. 4-34B.

Vehicle 80
tailgate 82

Example Grill of FIGS. 4-13 grill 101
docking plate 110
raised central support section 112
side support flange 116, 117
attachment features 111a, 111b, 111c, 111d
tabs 113a, 113b, 113c, 113d
lever 115a, 115b, 115c, 115d
raised handle 160a, 160b, 160c, 160d
pivot latch 118a, 118b, 118c, 118d
base pedestal 119a, 119b, 119c, 119d
cover 120
handle 121
vent 132, 134
vent handle 133, 135
temperature gauge 136 ??
cover lock 137
grill body 140
feet 145a, 145b, 145c, 145d
front panel 150
burner controls 151, 152, 153
gas connector 155
hinge bar 156
hinge brackets 157a, 157b, 157c
grate 170
burners 180, 181, 182

Example Grill of FIGS. 14-28 grill 201
docking plate 210
    attachment features 211a
      pin retention hole 212a
      pivot latch 218a,
      docking plate lock 217
grill main body assembly 240
    main body housing 530
      main body front 532
      main body rear 534
    valence 535
    bottom 241
    right side 242
      vent 350
  left side 243
    vent 360
  rear 300
    rear panel 310
      drip pan opening 312
  front 370
  feet 245a, 245b, 245c, 245d
    disk 246
      tabs 244
    mounting bolts 247
    spring-loaded pin 248
    spring 249
front panel 250
  burner controls 251, 252, 253
gas connector 255
burner assembly 400
  manifold 440
  burner cover 405
    left v-shield 380
      mounting tab 382
      slots 384
    middle v-shield 390
    right v-shield 439
      right v-shield mounting bracket 406
  left burner assembly 410
    linear burner element 412
    manifold connection 414
    gas control valve 416
    mounting tab 418
  middle burner assembly 420
    U-shaped burner element 422
    manifold connection 424
    gas control valve 426
    mounting tab 428
  right burner assembly 430
    linear burner element 432
    manifold connection 434
    gas control valve 436
    mounting tab 438
grate 500
drip pan assembly 290
  drip sections 291a, 291b, 291c
  reservoir 292
  drip pan handle 293
    lock pin hole 294
  spring lock pen 340
    pull tab 341

-continued threads 342
        nut 343
        drip guide 515
        drip tay mounting rail 320
        burner mounting flange 330
        drip pan slide bracket 525
        drip pan stop bracket 540
    lid assembly 450
        lid body 451
        lid handle 453
        top 452
        right side vent 454
            vent cover 455
        left side vent 458
            vent cover 459
        lid hinge bar 505
        latch pin 560
        latch 562
    handle assemblies 470
        right handle assembly 470b
            right handle 472b
            right handle bracket 474b
            right handle cover plate 476b
            knurled thumbscrews 477
            nuts 478
        left handle assembly 470a
            left handle 472a
            left handle bracket 474a
            left handle cover plate 476a
    heat guard 520 barbeque grill

In this specification, the term "docking plate" refers to an attachment element that includes a generally planar grill support structure having at least one grill attachment feature, where the grill attachment feature is configured to releasably mate with a foot or other mating feature provided on a grill.

In this specification, the term "docking mechanism" refers to a docking plate, or to one or more discrete grill attachment features such as "docking feet" which are configured to be provided on a vehicle tailgate, cart, or other surface in order to releasably support a grill during transit or use.

FIGS. 4-7 are a front perspective view, a front view, a side view, and a top view of an embodiment of a barbeque grill 101 with a docking plate 110. In this embodiment, a grill body 140 is temporarily secured to a docking plate 110. A cover 120 is pivotally mounted on the body 140 so that the cover may be opened to expose a cooking grate. The cover may include a lock 137 which serves to reduce rattle between the cover and grill when the grill is transported.

In this embodiment the grill body 140 is supported by four feet 145a, 145b, 145c, 145d which are slotted as described below so that pivotal latches provided on the docking plate 110 are used to temporarily secure the grill body to the docking plate.

In this embodiment, a front panel 150 includes three burner controls 151, 152, 153 which are used to control the gas flow rate to three burners. Gas is provided to the burners by connecting a gas cylinder (not shown) to a gas connector 155 on the side of the body. In another example, the burner controls are inset into the front panel so that the knobs are not damaged when the grill is hit or bumped.

In one example, each burner control regulates the gas flow to one of three burner elements. This 9 burner and 3 valve heat/flame control system spreads heat to every area of the grate for more even cooking. Igniters are provided on each burner control so that each burner is easy to light.

cover

In this embodiment, the cover 120 has angular facets which provide a higher central cooking portion and lower side portions. The higher central cooking portion allows for heat distribution and heat buildup for deeper cooking temperatures. In one example, the grill is provided in a low-profile 16 inch height. The cover includes a locking mechanisms which prevents rattle and lid flying open during transport.

Vents 132 and 134 are provided in side facets. Vent handles 133 and 135 are used to open and close the vents to a desired setting. The large adjustable air vents allow accurate temperature control for precision cooking. A temperature gauge 136 is provided in the cover to monitor the air temperature in the grill chamber.

In this embodiment, the cove 120 includes a commercial grade, center-of-gravity handle 121 which allows user to pick up and carry the grill by the handle.

Figure 4:
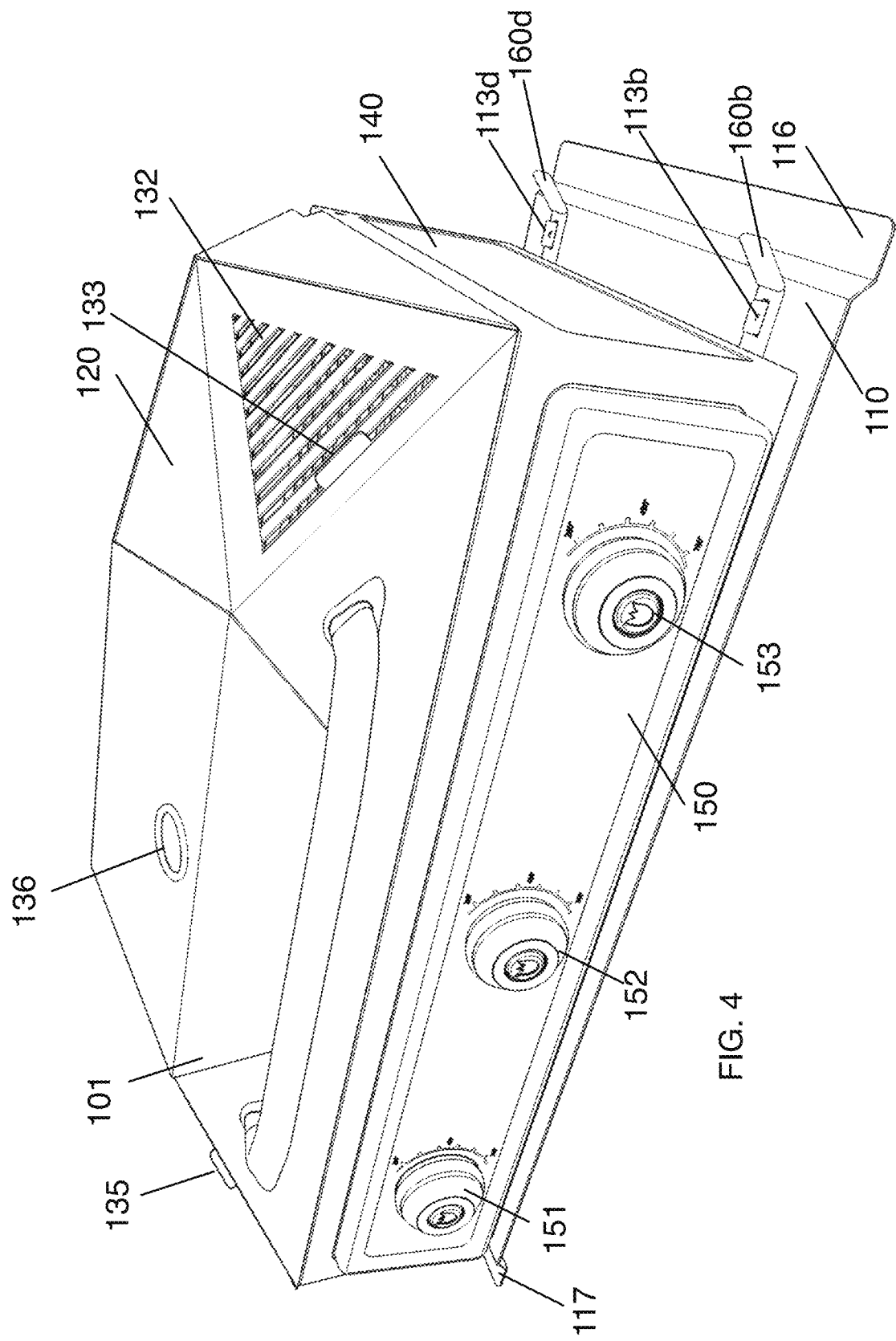
FIGS. 4-13 show a first embodiment of a barbeque grill with a docking plate
Figure 5:
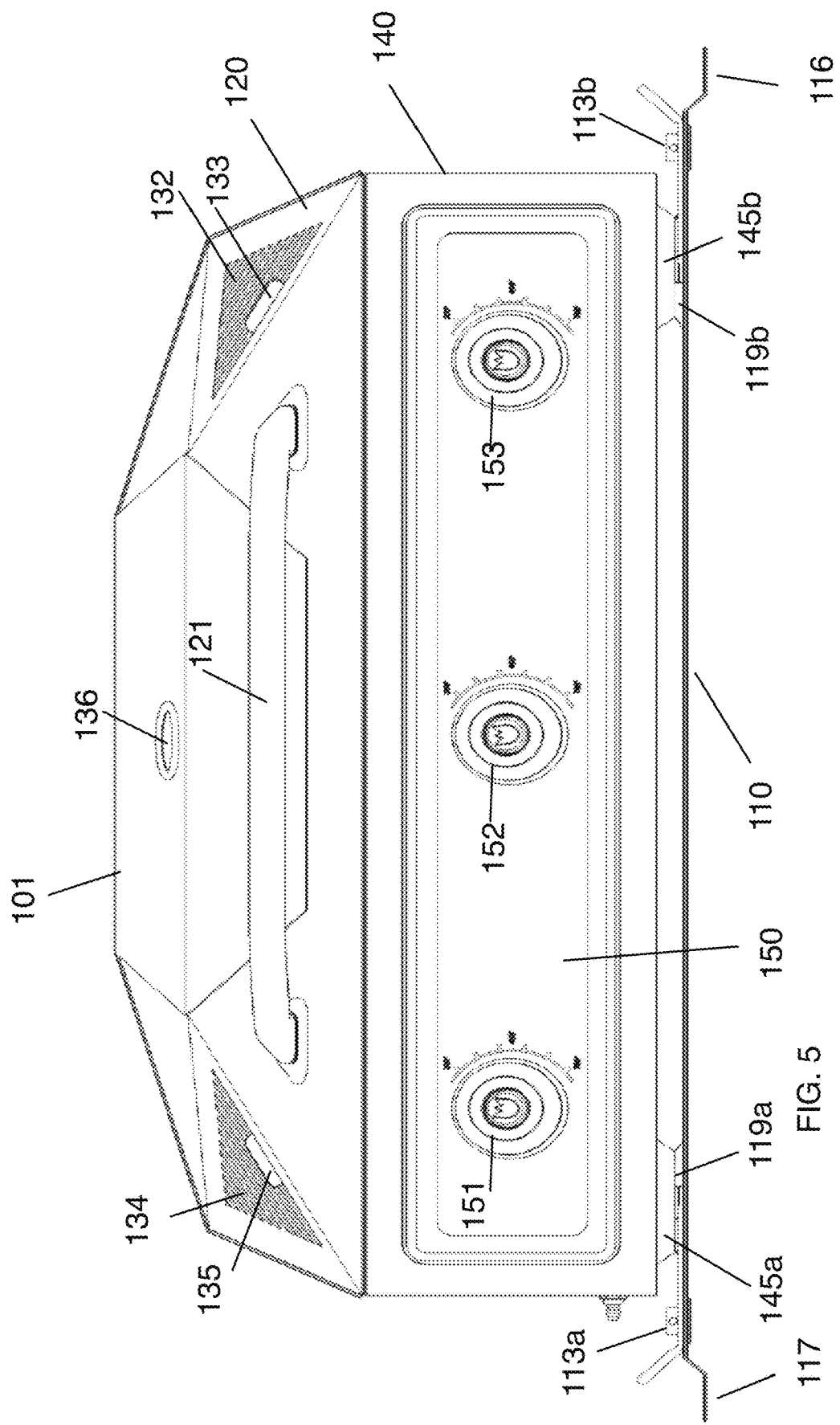
Figure 6:
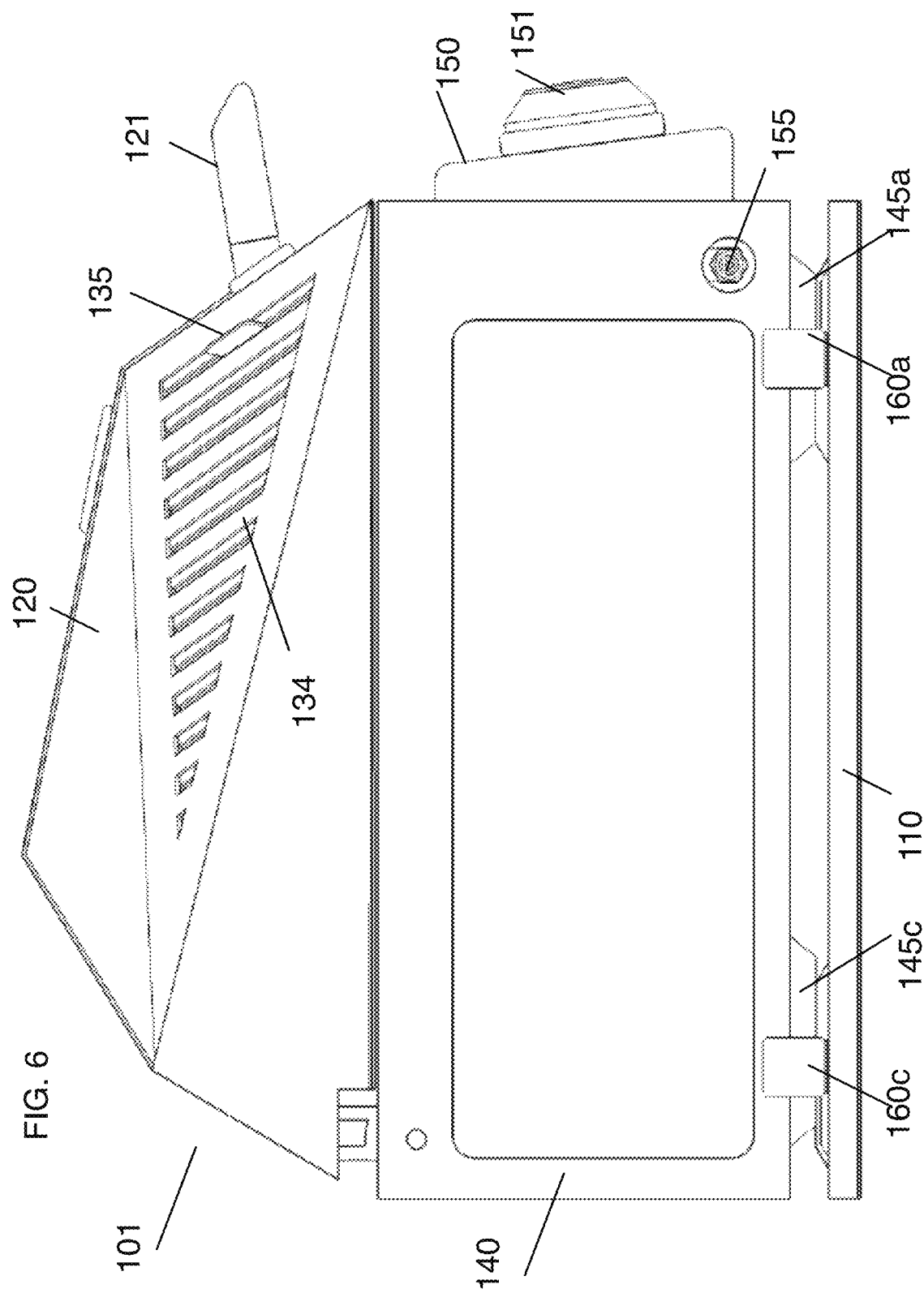
Figure 7:
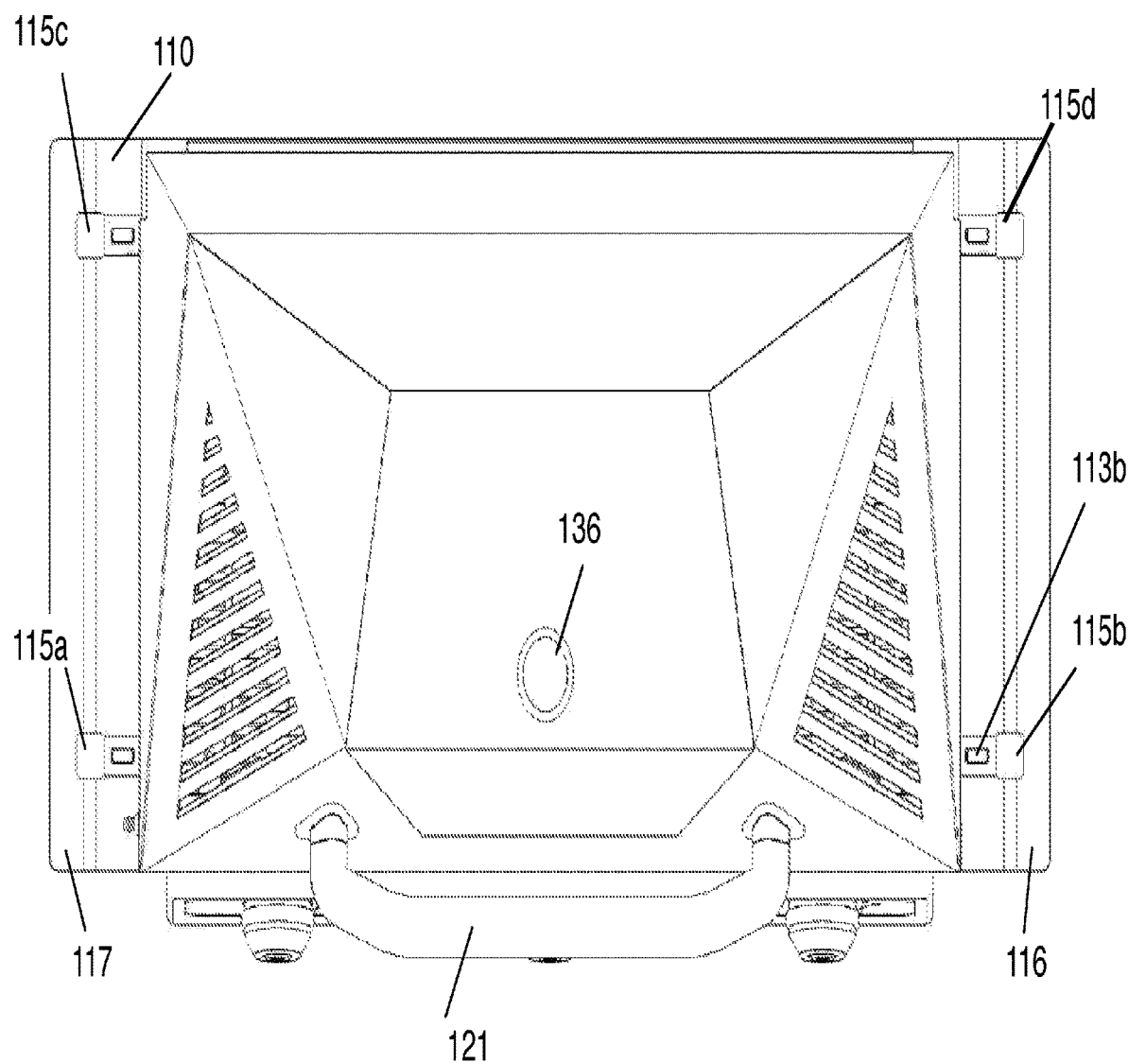
Figure 8:
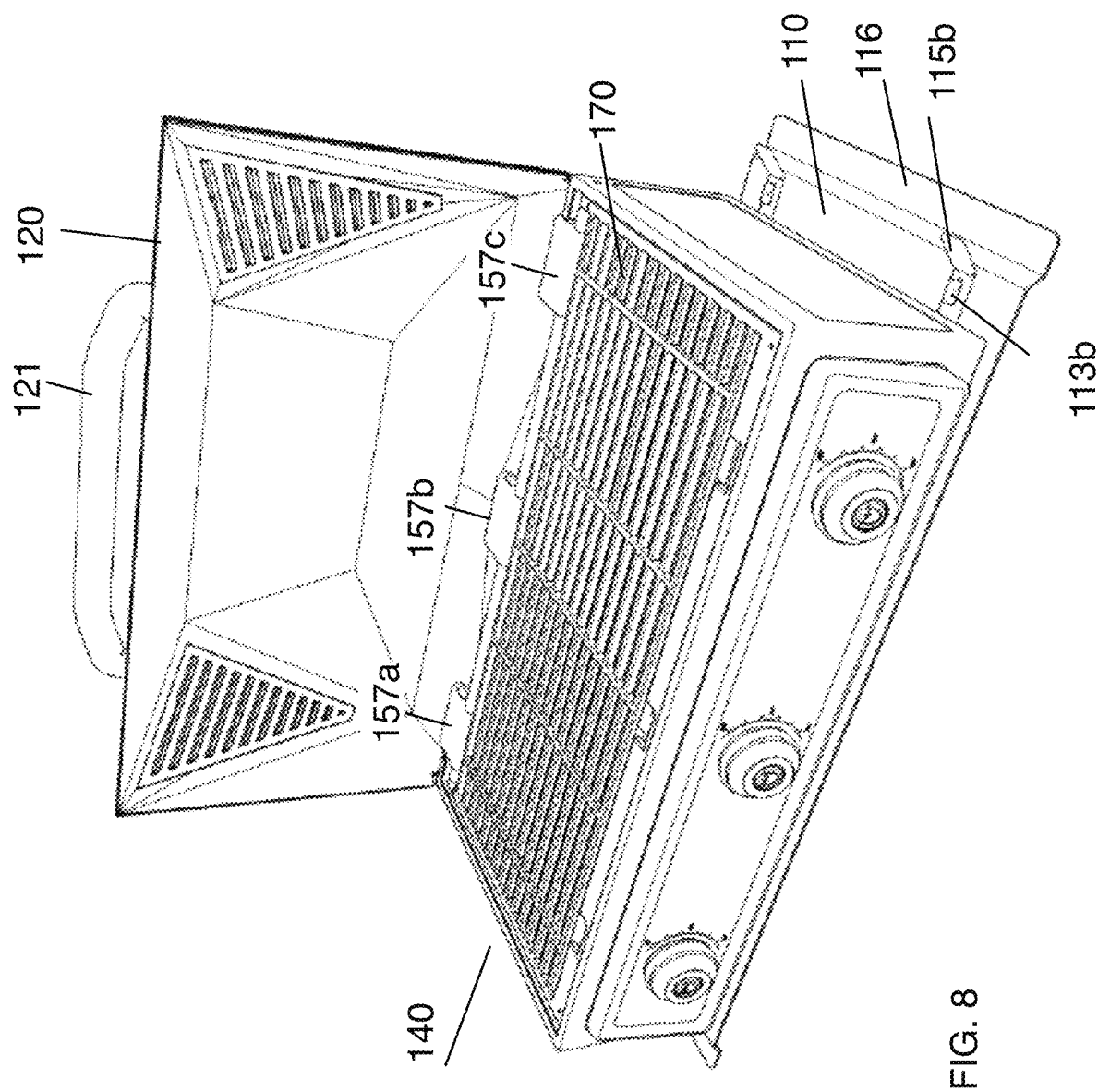

FIG. 8 is a front perspective view of the barbeque grill with a docking plate of FIG. 4 with the cover 120 open. In this example, the cover 120 is attached to the body with three hinge brackets 157a, 157b, 157c which rotate on a hinge bar 156. The cover 120 may be rotated past vertical so that the cover will remain in an open orientation until it is closed. In this example, the hinge bar is a solid, stainless steel rod which resists rusting, bending or breaking and reduces hinge wobble.

In one example, the body and cover are double-walled with a ⅛" Aluminum Diamond Plate Exterior and a 1/16" Stainless Steel Interior. The double wall allows the grill to get hotter on the inside without dissipating heat. Stainless interior with no coating removes the chance of flaking of poisonous powder coating from falling onto food. Also, double wall keeps the outside surface cool to the touch. The sturdy shell prevents dents.

In some examples, the grill is provided in a Scorched Black or Diamond Silver finish. Users can choose the color of their choice. The Scorched Black finish is anodized aluminum, and the Diamond Silver finish is stainless steel.

grating

Figure 9:
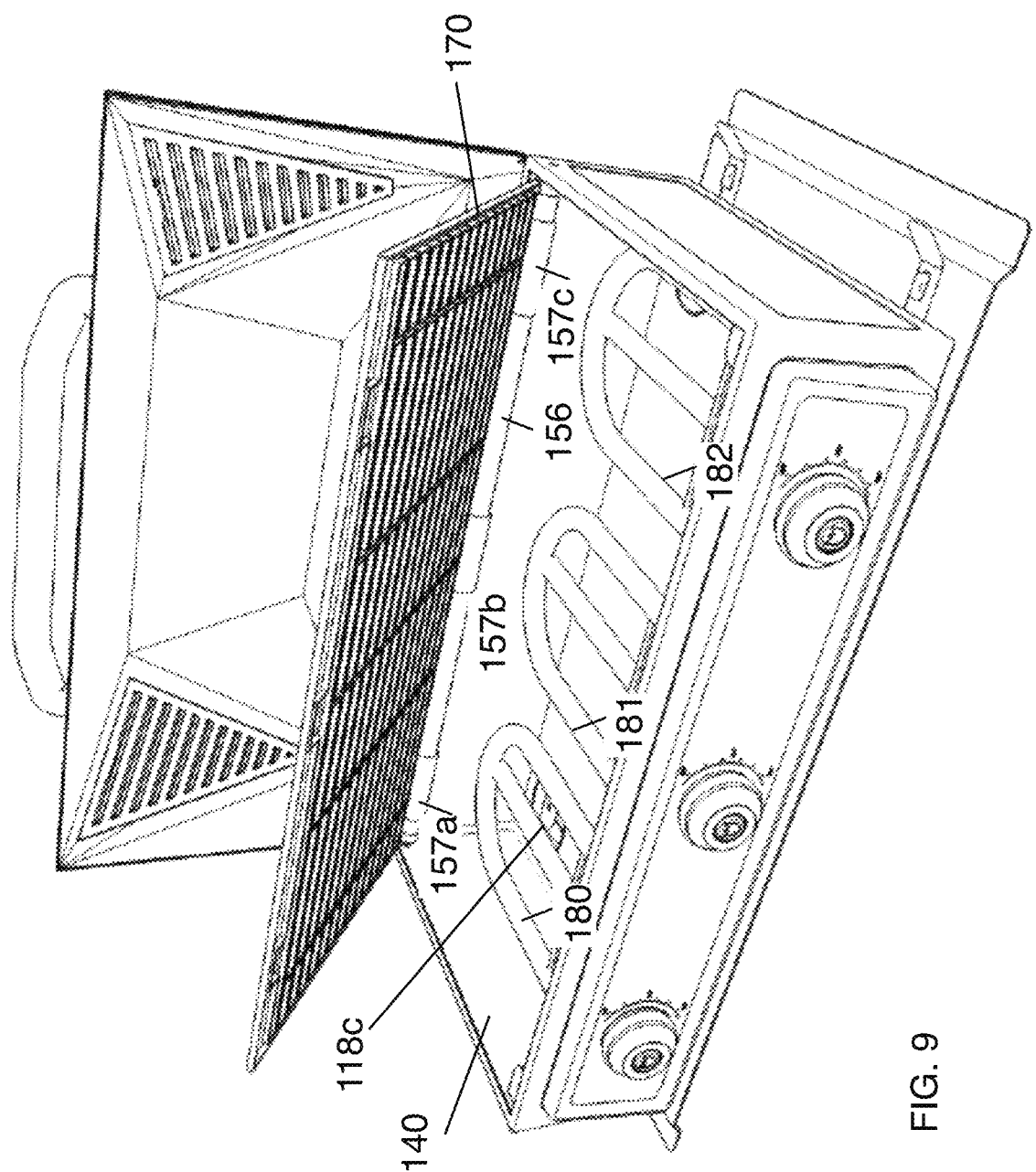
Figure 10:
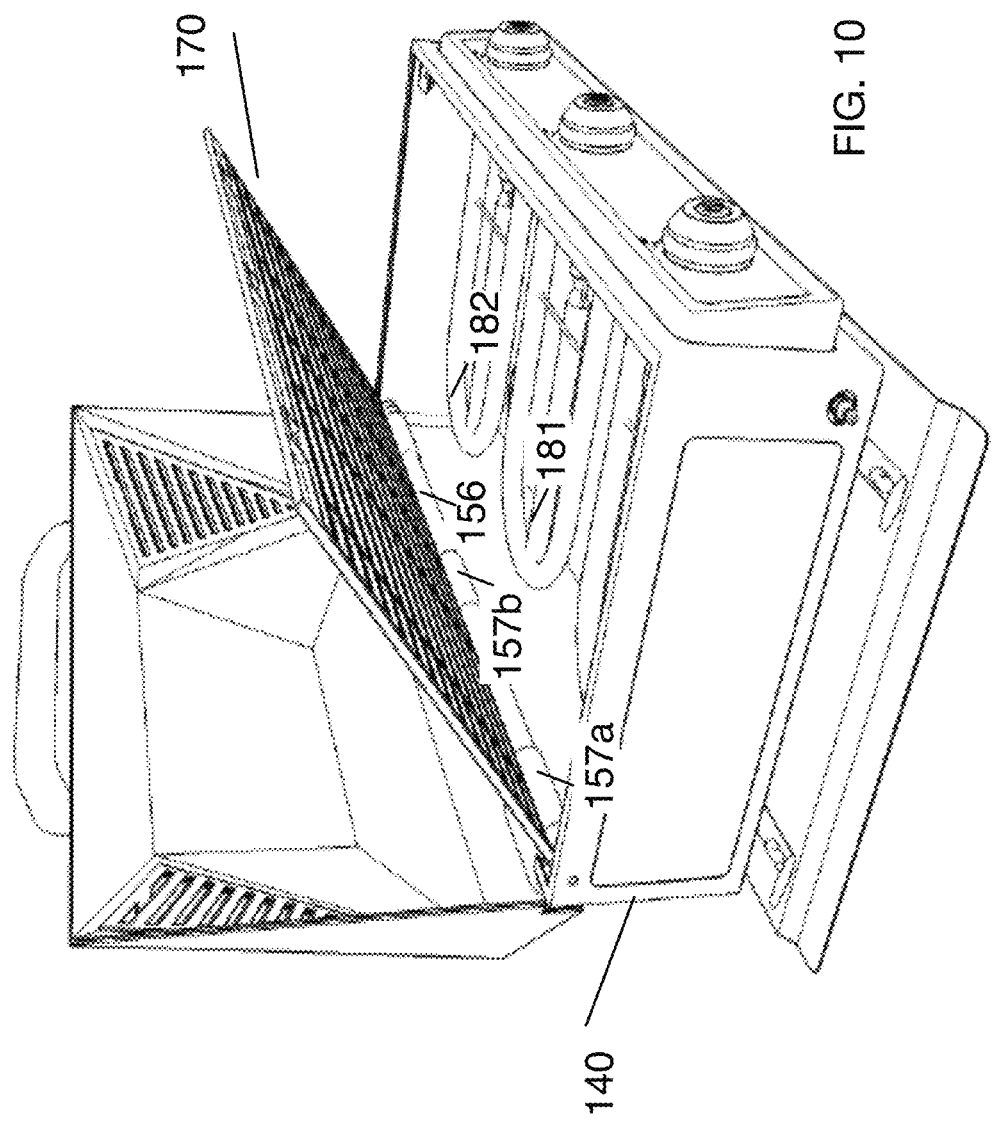

FIGS. 9 and 10 are a front perspective view and a side perspective view of the barbeque grill with a docking plate of FIG. 4 with the cover 120 open and a grate 170 partially raised. In this example, the grate 170 is also attached to the body with the three hinge brackets 157a, 157b, 157c which rotate on a hinge bar 156.

The grate 170 may be raised to expose or clean the burners 180, 181, 182. The grate may be locked down to prevent rattle and bouncing during transport, and to prevent damage to the grill interior. Internal parts are securely attached to prevent rattle and damage. Solid metal grates to inhibit rusting.

drip pan

In one example, a removable no-spill drip pan is inserted below the burners. The drip pan includes a large reservoir configured to hold liquid without spill in both the horizontal orientation during use, and the vertical orientation when the grill is transported, such as with the vehicle tailgate up.

docking plat

In this embodiment, the docking plate is a heat resistant plate that can be attached to a vehicle tailgate. The docking plate allows the user to nest, lock and carry the grill in the back of the pickup bed for convenient transportation and use. The docking plate is configured to attach to most standard tailgates.

The docking plate securely locks the grill body into place, but permits the grill body to be flipped or removed. In one example, locking holes accept a combination lock to prevent theft.

Figure 11:
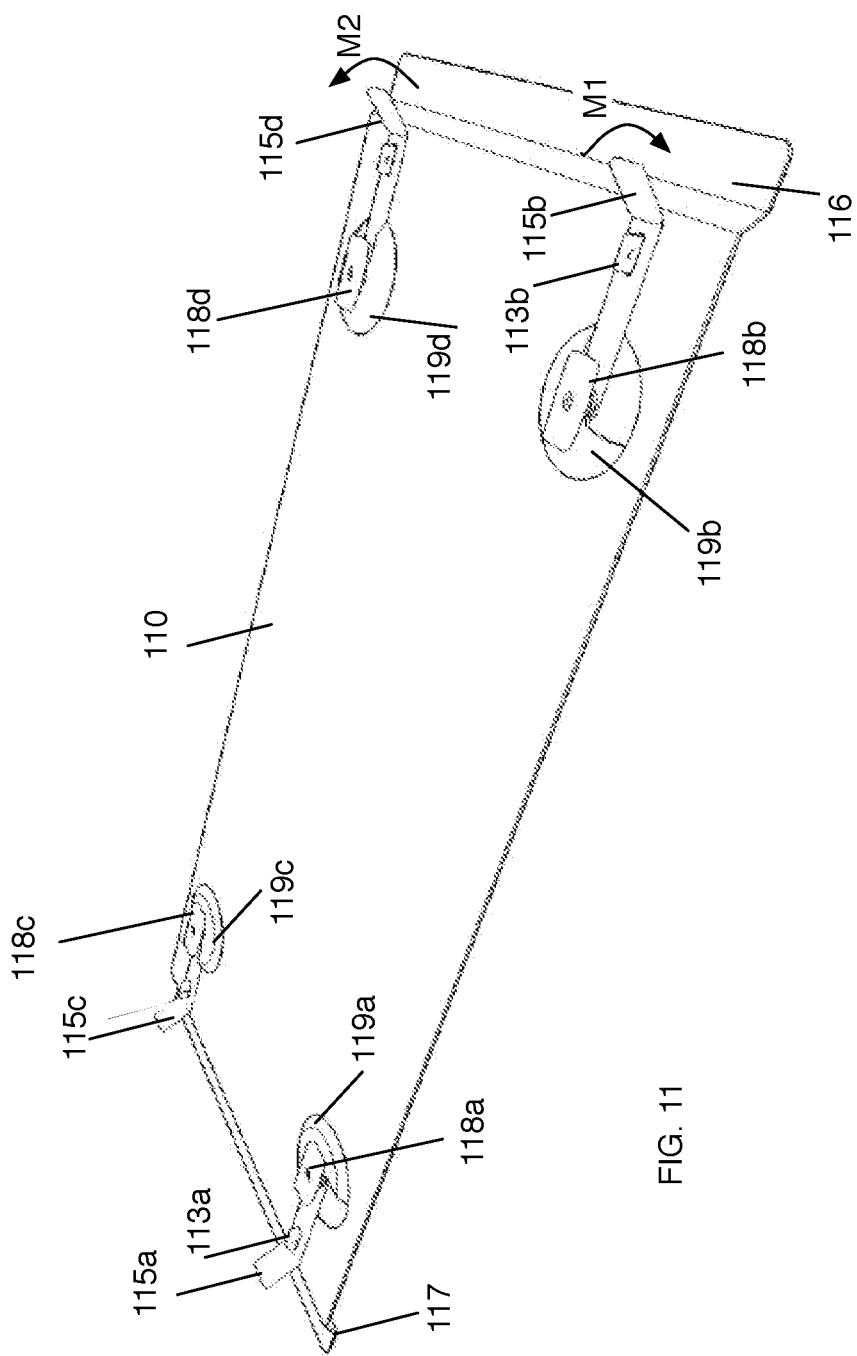
Figure 12:
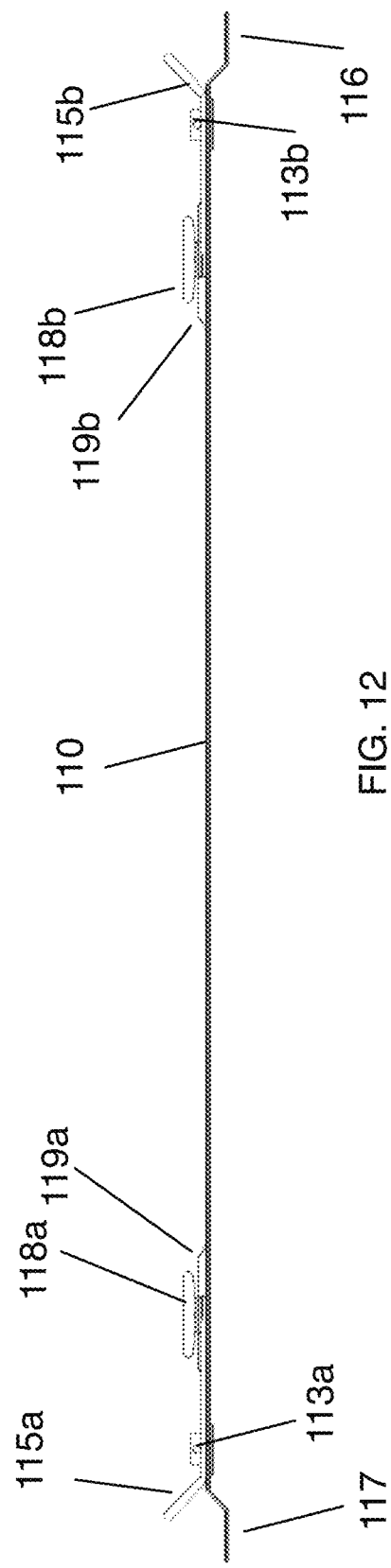
Figure 13:
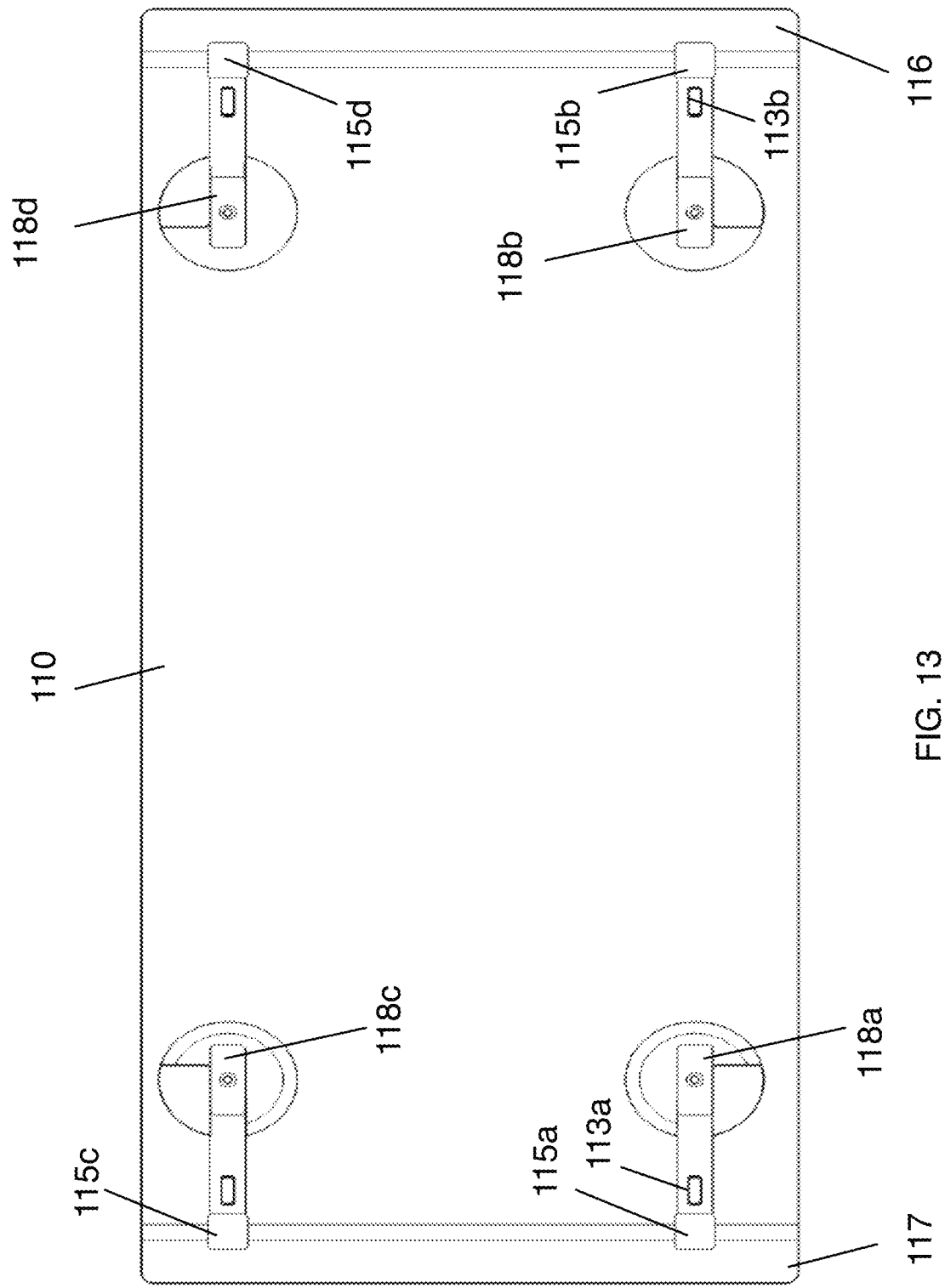

FIGS. 11-13 are a top perspective view, a front view, and a top view of the docking plate of the barbeque grill of FIG. 4. In this example, the docking plate 110 has two side support flanges 116 and 117 which support a raised central support section 112. By raising the central section, an air gap is provided between the central support section and the truck bed or tailgate, or other support surface, and this air gap substantially reduces heat transfer from the grill to the support surface.

Four attachment features 111a, 111b, 111c, and 111d are provided on the docking plate near the corners of the grill body 140. In this embodiment, each attachment feature comprises a pivotal latch 118 that pivots on a base pedestal 119 from a latched orientation that secures the grill body 140 to the docking plate, to an unlatched orientation which permits the grill to be lifted away from the docking plate.

In this example, a lever 115 is used to pivot the latch 118 between the open orientation and the latched orientation. Lever 115 includes a raised grip portion 160. The lever is moved by raising the grip portion so that the lever may be partially rotated. The pivotal latch 118 is secured to the lever 115 so that the latch 118 rotates 90 degrees from a latched orientation to an unlatched orientation as the lever 115 is rotated 90 degrees. In other examples, other latch mechanisms may be used.

In this embodiment, feet slots are provided in feet 145a, 145b, 145c, 145d on the body 140. In the unlatched orientation, the pivot latch 118 is aligned with its corresponding foot slot so that the body 140 may be lifted away from the docking plate. In the latched orientation, the pivot latch 118 is rotated across the corresponding foot slot so that the body 140 is secured to the docking plate.

In other embodiments, other mounting techniques can be used to temporarily secure the body to the docking plate.

Example Grill

FIGS. 14-28 describe an example grill with additional features and configurations of the grill.

FIG. 14A is a left front perspective view of a second embodiment of a grill 201 showing a left side 243, and a front panel 250. FIG. 14B is a right front perspective view of the grill of FIG. 14A showing a right side 242. FIG. 14C is a left side view of the grill of FIG. 14A showing left side 243 and left side vents 360. FIG. 14D is a top view of the grill of FIG. 14A showing lid assembly 450. FIG. 14E is a front view of the grill of FIG. 14A showing front panel 370. FIG. 14F is a right view of the grill of FIG. 14A showing right side 242. FIG. 14G is a rear view of the grill of FIG. 14A showing rear portion 300.

Figure 14:
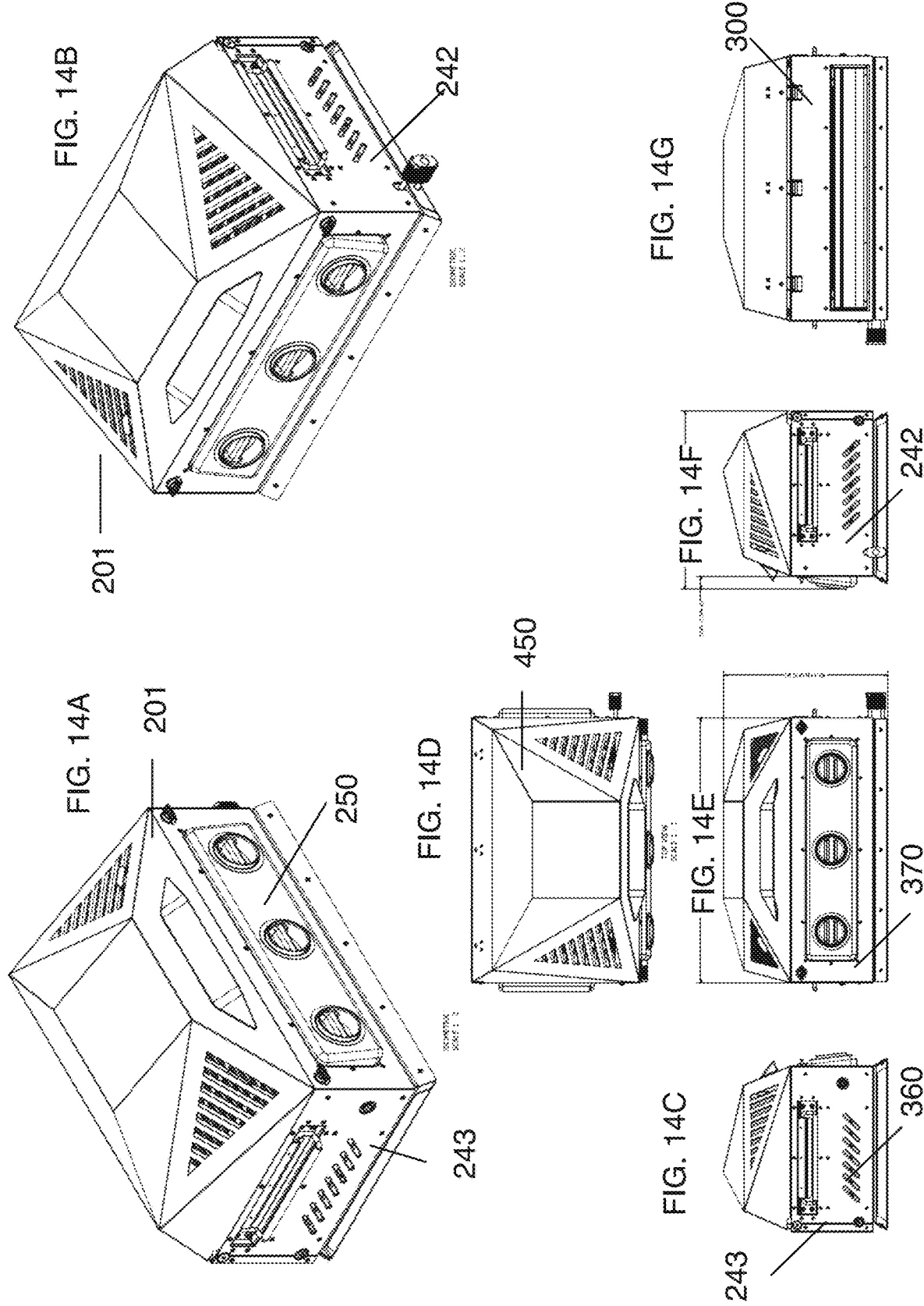
Figure 15:
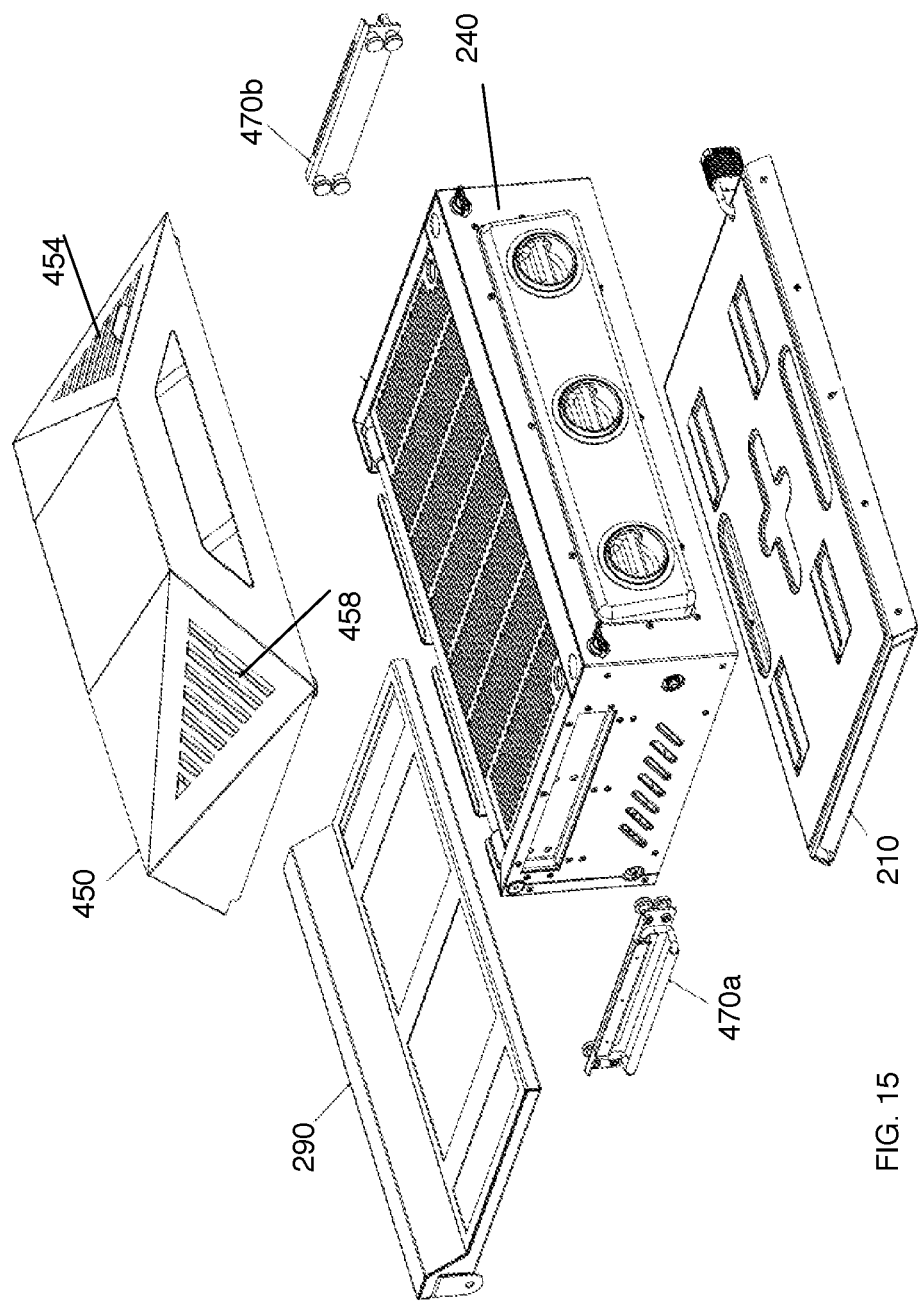

FIG. 15 is an exploded view of the grill of FIG. 14A showing a lid assembly 450, a removable drip pan assembly 290, a main body assembly 240, a left handle assembly 470a, a right handle assembly 470b, and a base plate assembly 210. The top assembly 450 includes a right side vent 454 and a left side vent 458.

Figure 16:
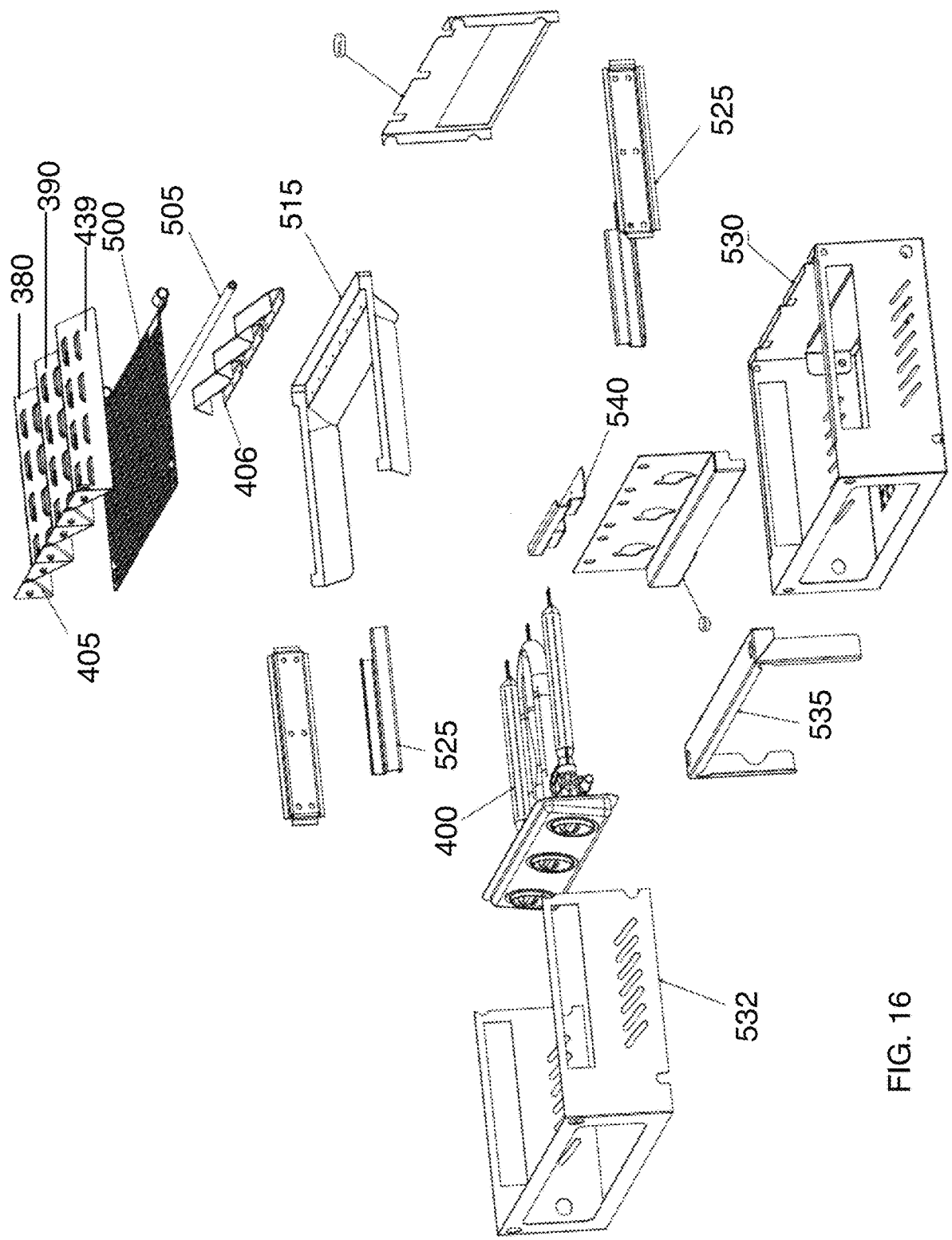

FIG. 16 is an exploded view of the internal components of the main body assembly 240 of the grill of FIG. 14A. The main body housing 530 is formed from main body rear panel 534 and main body front panel 532. In this example, the main body front panel 532 is bent top form left and right side panels. Drip pan slide brackets 525 are attached to the left and right side panels. Burner assembly 400 is supported within the main body housing. Grate 500 is pivotally mounted above the burners. A vented burner cover 405 is mounted above the burners.

FIG. 17A-17D show the burner assembly 400 of the grill of FIG. 14A. In this example, a left burner assembly 410, a middle burner assembly 420, and a right burner assembly 430 are supported by mounting tabs 418, 428, and 438 respectively. Gas is supplied to the burner assembly through manifold 440.

Figure 18C:
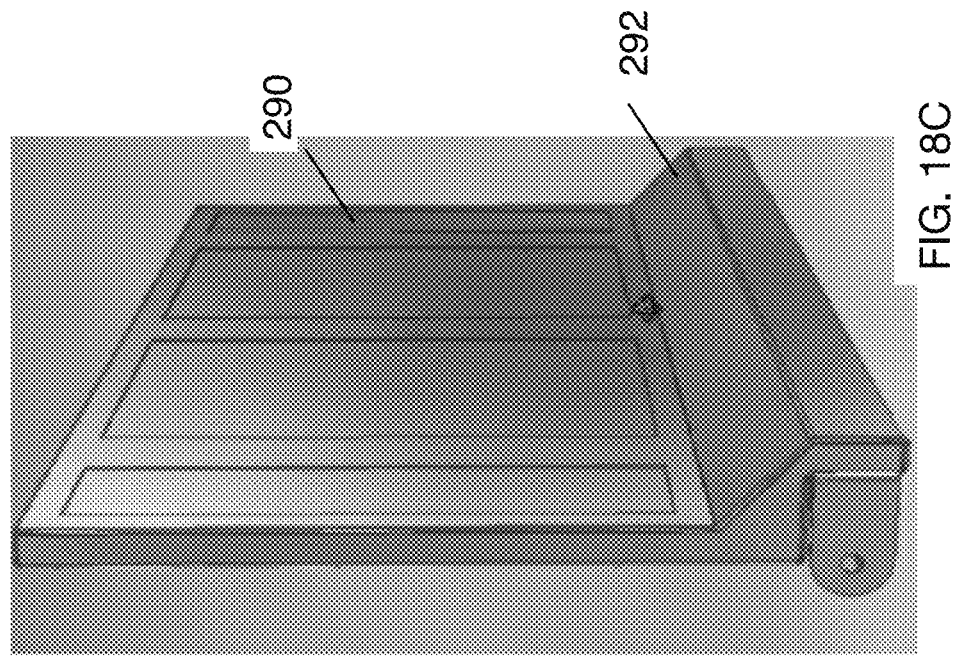
FIG. 18C is a side view of the drip pan for the grill of FIG. 14 in a vertical orientation.
Figure 18A:
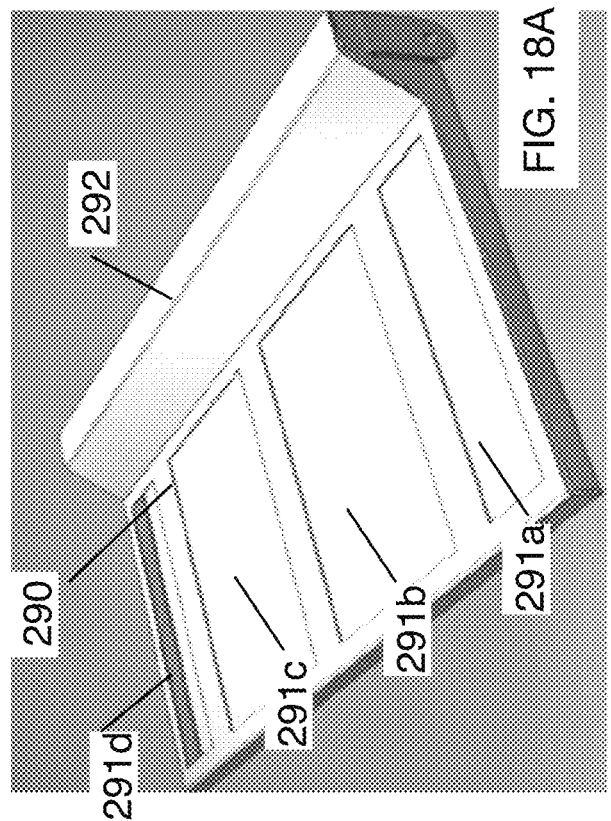
FIG. 18A is a top perspective view of a drip pan for the grill of FIG. 14.

FIG. 18A is a top perspective view of a drip pan 290 for the grill of FIG. 14 with four drip collection areas 291a, 291b, 291c, and 291d. In one example, the drip collection areas are covered with a mesh to prevent splashing. FIG. 18C is a side view of the drip pan 290 in a vertical orientation so that drip reservoir 292 is positioned below the drip collection areas. The drip pan is in a vertical orientation when the vehicle tailgate is up and the grill is being transported by the vehicle. In this vertical orientation, liquid caught in the drip pan is pooled in the reservoir 292 so that the liquid is not spilled in transit. The reservoir is large enough to hold liquid collected from multiple uses of the grill before the liquid must be drained from the drip pan. FIG. 18B is an exploded view of the drip pan 290 with drip pan handle 293. When the drip pan is fully inserted, a spring lock pen 340 (not shown) mounted on the side of the grill body engages a lock pin hole 342 (not shown) at the right end of drip pan handle 293.

FIG. 29A is a top perspective view of a drip pan 290. FIG. 29B is a left side view of a drip pan 290 partially inserted in a grill main body assembly 240. FIG. 29C is a rear view of the drip pan 290 fully inserted in the grill main body assembly 240.

Figure 19:
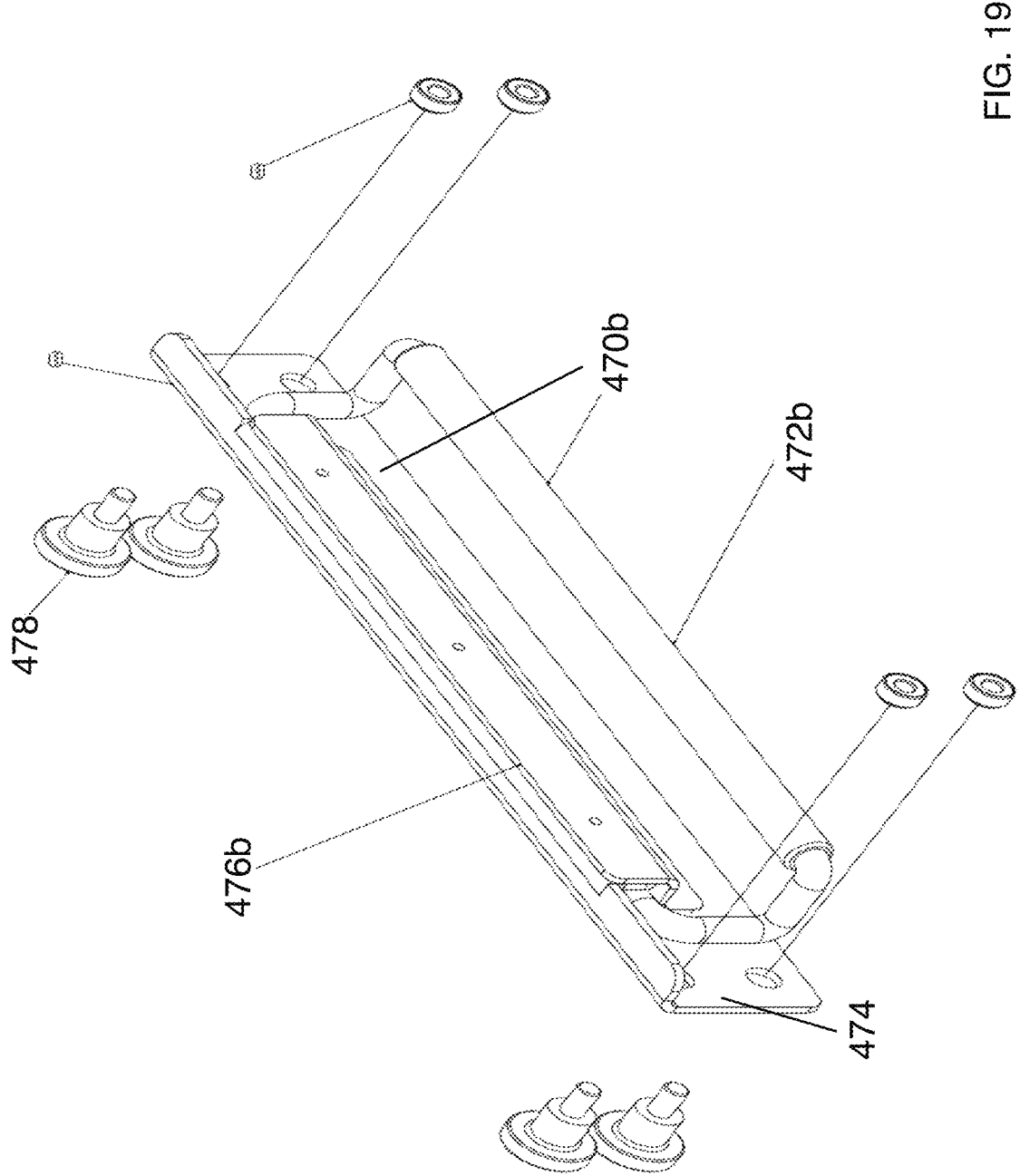

FIG. 19 is an exploded view of a right handle assembly 470b of the grill of FIG. 14A showing handle 472b, right handle bracket 474b, and right handle cover plate 476b. In this example, the left handle assembly has a similar construction.

Figure 20:
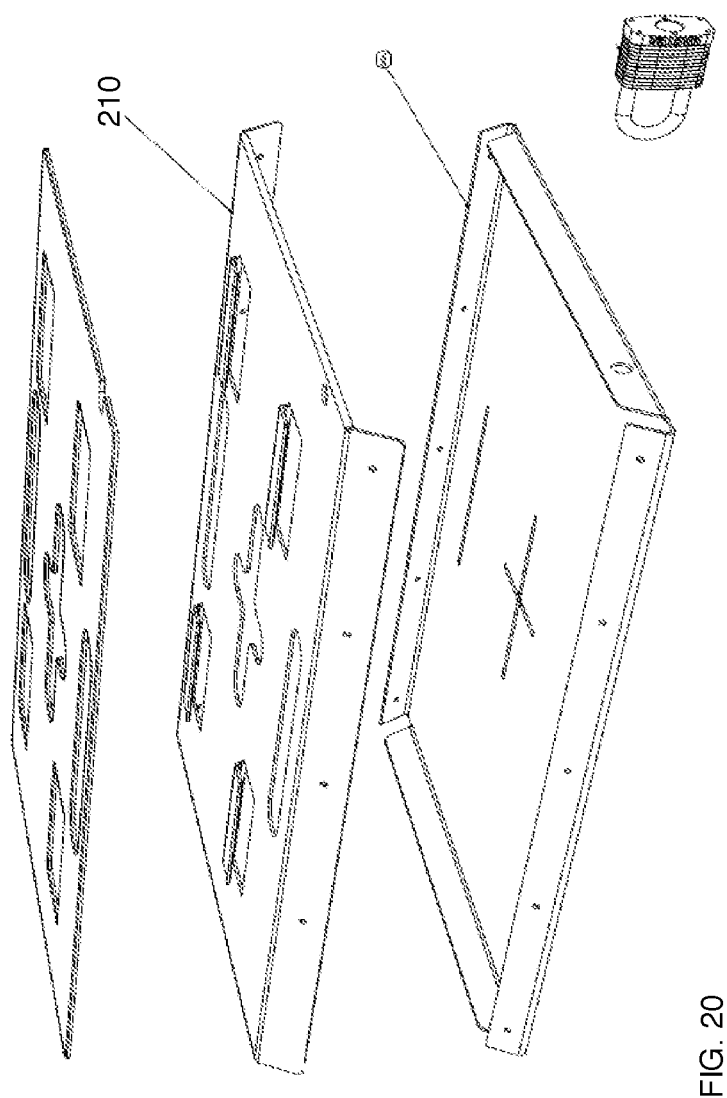

FIG. 20 is an exploded view of a base plate assembly 210 for the grill of FIG. 14A.

Figure 21:
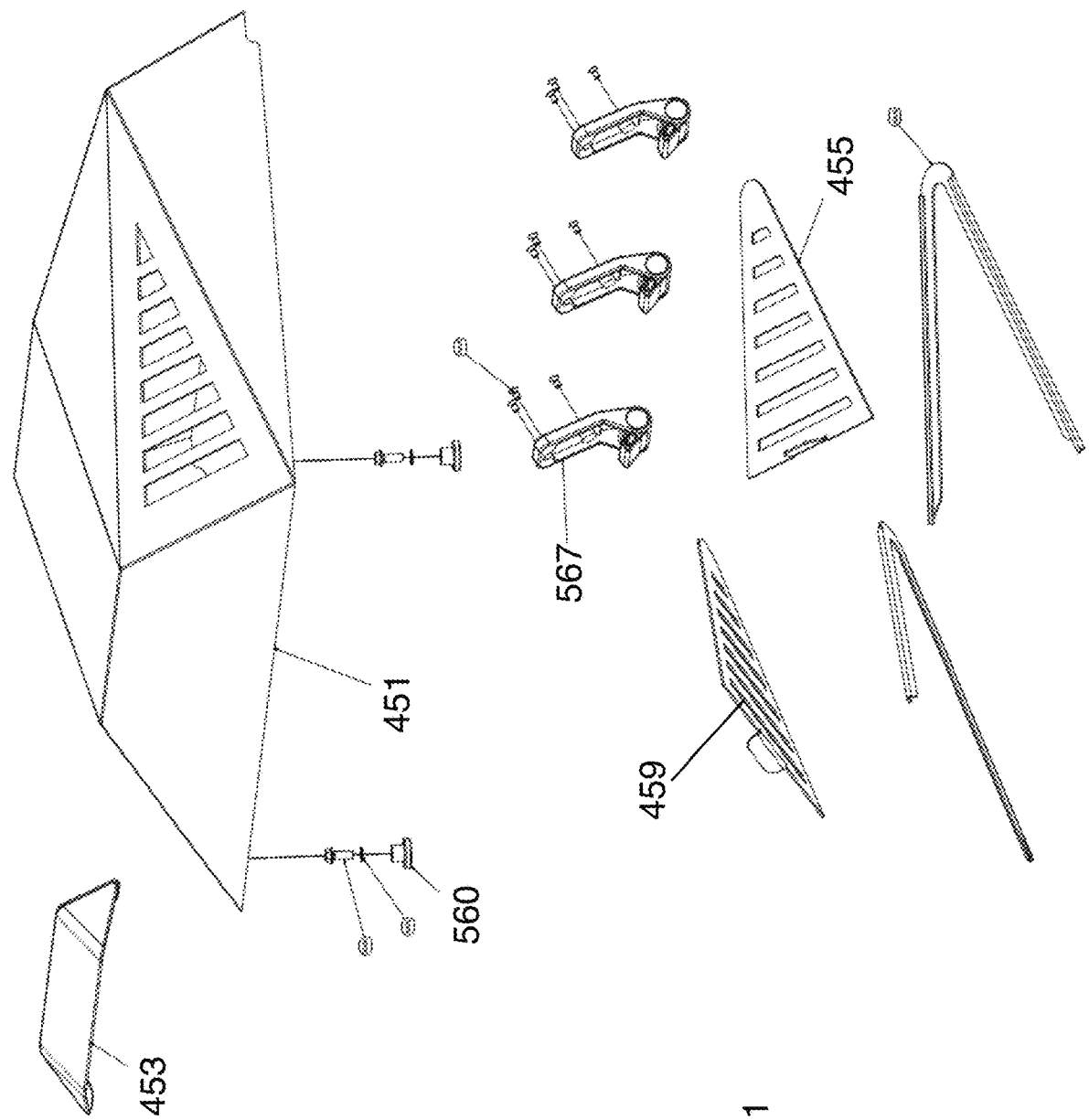

FIG. 21 is an exploded view of a lid assembly 450 of the grill of FIG. 14A. In this example, three latches 567 are provided to secure lid 451 to the main body. The lid assembly includes handle 453, right vent cover 455, and left vent cover 459. In this example, the combination of a relatively deep lip 451 and large adjustable vents enables good temperature control.

Figure 22:
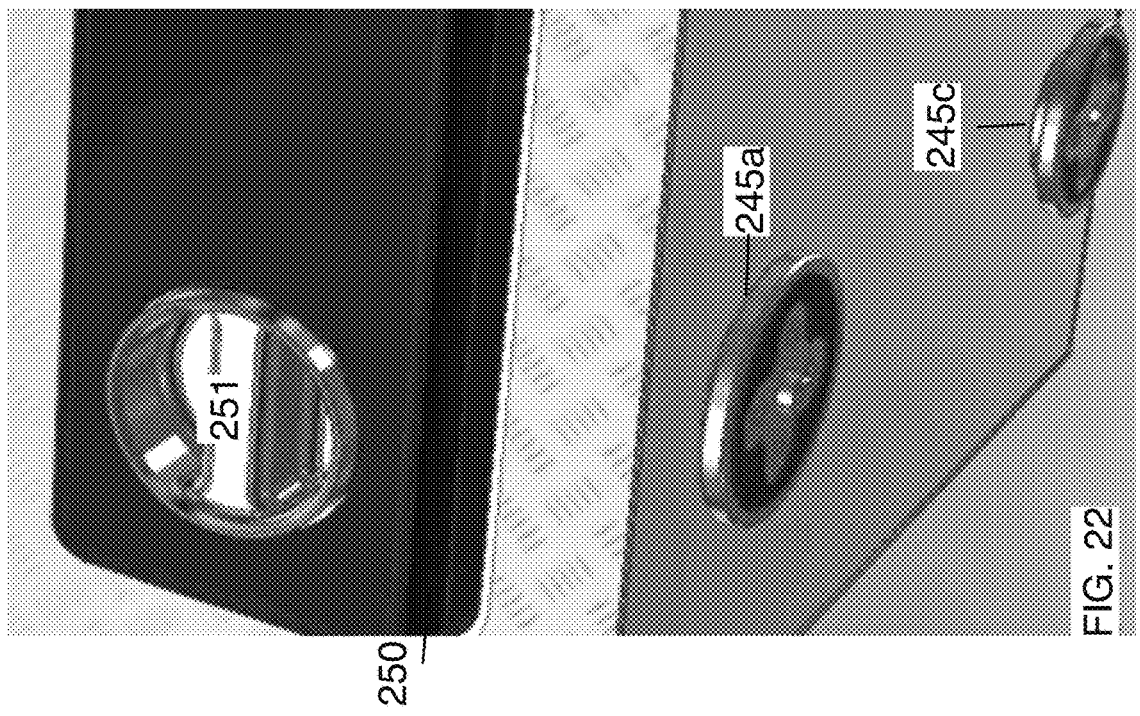

FIG. 22 is a partial front perspective view of a second embodiment of grill 201 showing a portion of the front panel 250 with a first burner control 251, and feet 245a and 245c.

Figure 23:
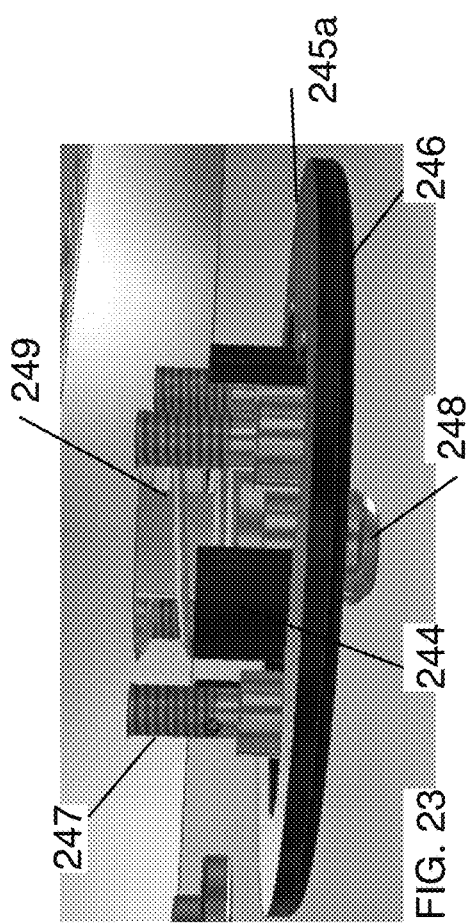

FIG. 23 is a partially exploded detailed front perspective view of foot 245a showing a disk 246 which is configured to be retained by a docking plate attachment feature 211a (not shown). In this example, the disk is spaced apart from the bottom of the grill body by three tabs 244 extend upwardly from the top of the disk. Mounting bolts 247 attach the disk to the bottom of the grill body. A spring 249 depresses spring-loaded pin 248 into a pin retention hole 212a (not shown) in the docking plate 210.

Figure 24:
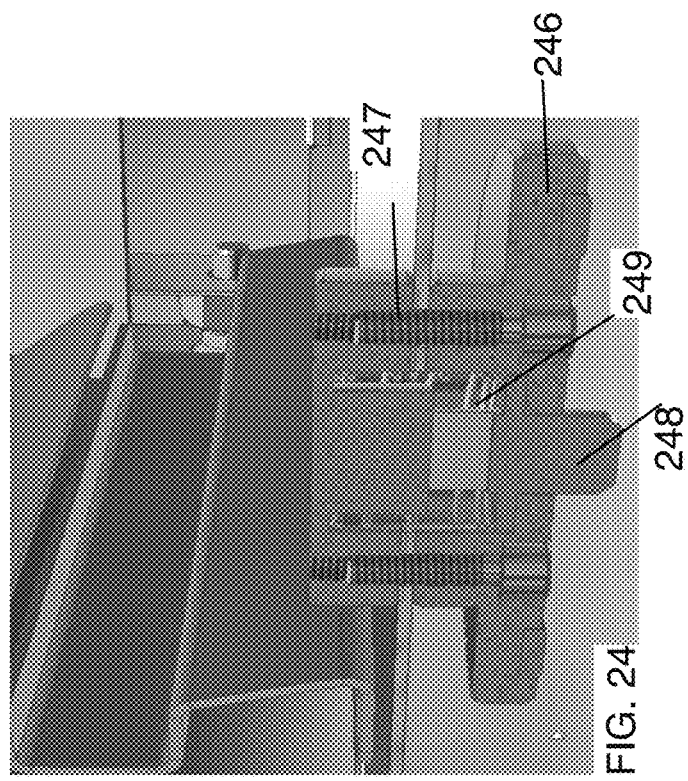

FIG. 24 is detailed side cross section view of another example foot. In this example, the disk portion of the foot is spaced apart from the bottom 241 of the grill body 240 with a shoulder 243.

Figure 25:
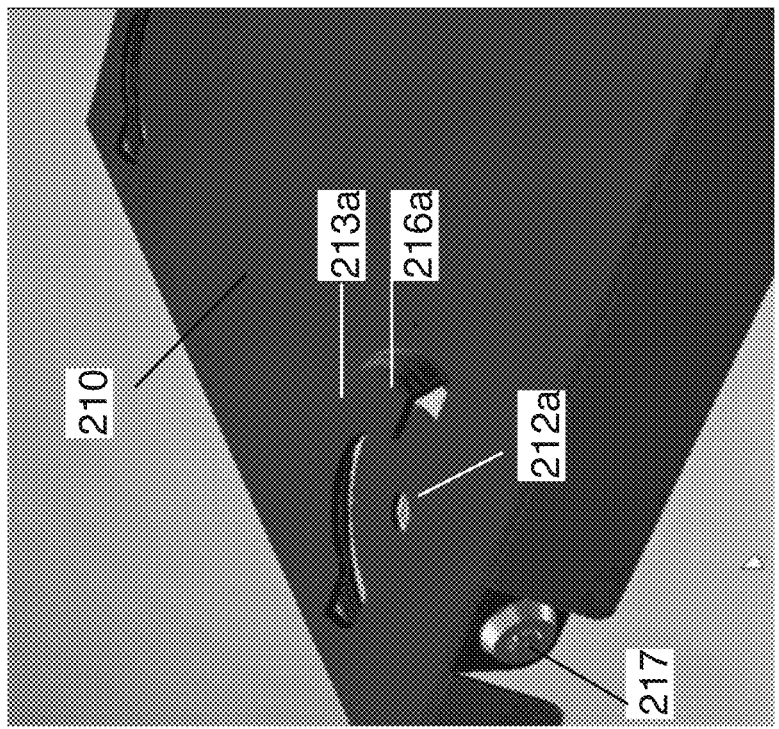

FIG. 25 is top perspective view of a portion of a docking plate 210 of the grill 201 showing a docking lock 217 and an attachment feature 213a. In this example, the attachment feature 213a includes a pin retention hole 212a and a raised hemispherical bracket 216a which is configured to secure a portion of the disk 246 of grill foot 245a.

Figure 26:
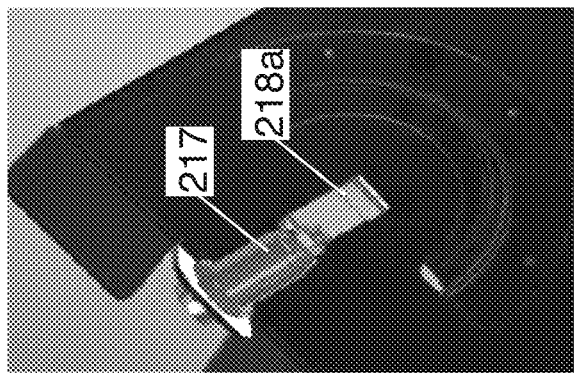

FIG. 26 is bottom perspective view of a portion of the docking plate lock 217 of FIG. 25. In this example, when a key is inserted in the docking plate lock and turned, pivot latch 218a is turned so as to retain disk 246 in raised hemispherical bracket 216a. When the key is used to unlock the docking plate lock, the pivot latch 218a is disengaged from disk 246. In other examples, a locking may be provided without a key.

Figure 27:
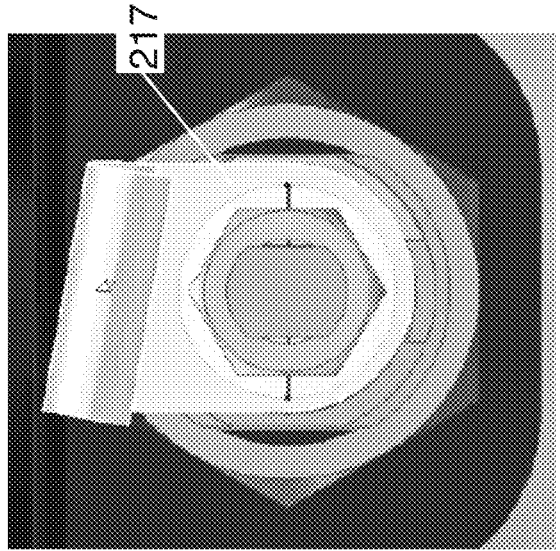

FIG. 27 is a front view of the docking plate lock 217 of FIG. 26. In this example, a pivotal latch is used to secure the main grill body to the docking plate. In other examples, other latch mechanisms may be used.

Figure 28:
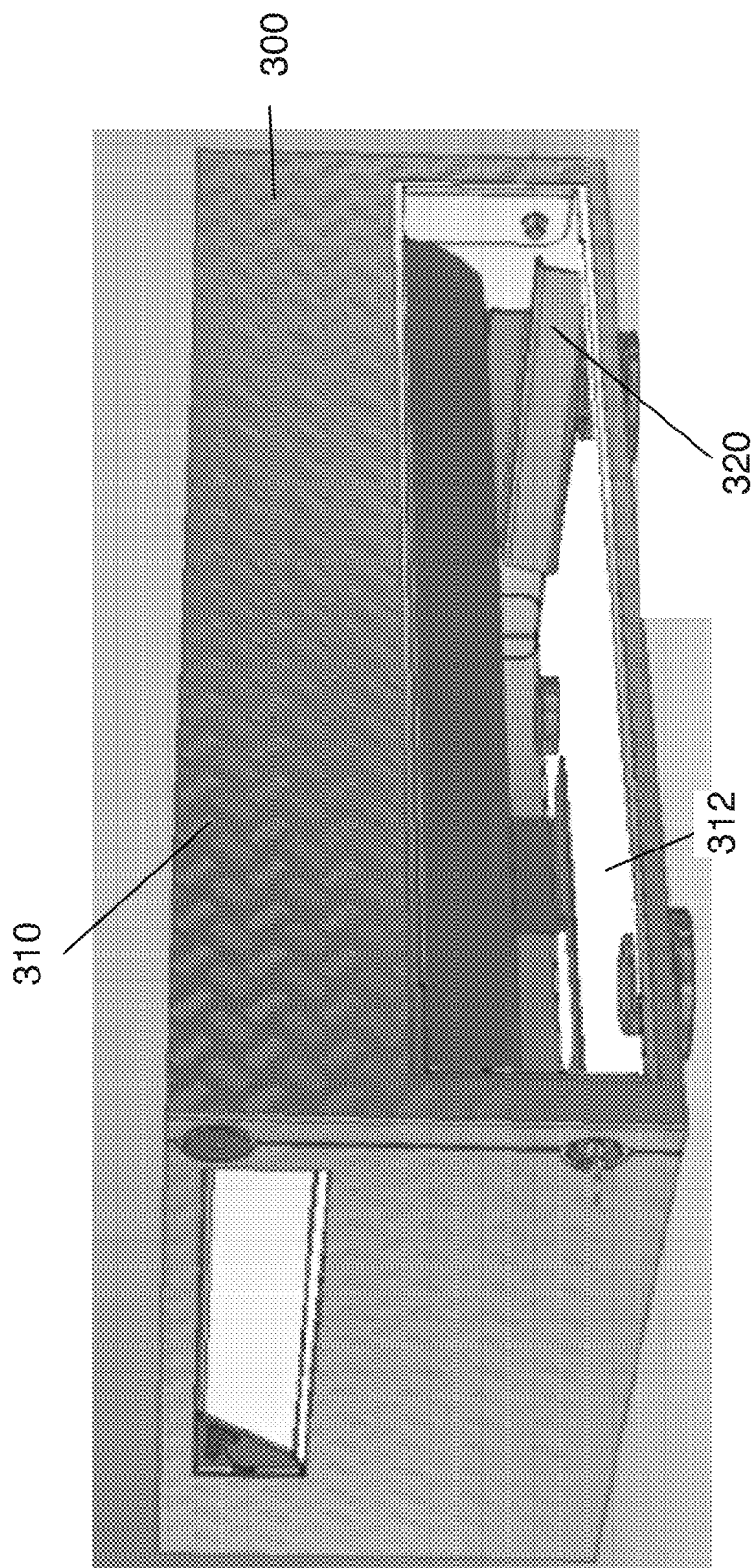
Figure 29:
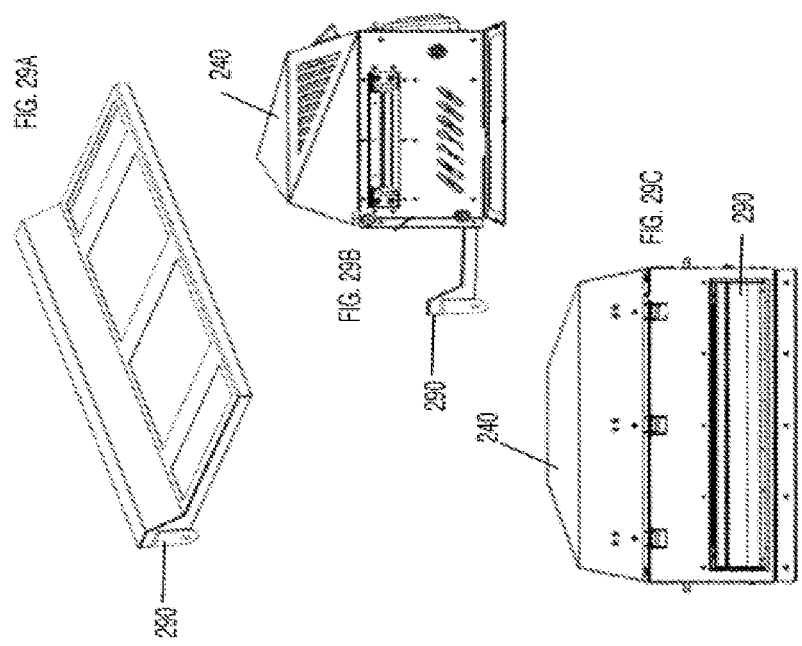
FIG. 29A is a top perspective view of a drip pan.
FIG. 29B is a left side view of the drip pan 290 of FIG. 29A partially inserted in a grill main body assembly.
FIG. 29C is a rear view of the drip pan of FIG. 29A fully inserted in a grill main body assembly.

FIG. 28 is a rear perspective view of the rear 300 and rear panel 310 for the grill 201. In this example, the rear panel 310 includes a drip tray opening 312 which is configured to accept the drip pan 290. In this example, The drip tray is supported by a drip tray mounting rail 320 on each side of the drip tray rather that by a slide.

In one example, the grill main body has a double wall housing with an attractive diamond finish.

Other Docking Mechanisms

The examples above describe mounting a grill on a docking plate. In other examples, a grill may be transported or used while attached to an alternate form of docking mechanism such as a plurality of feet receptacles where each receptacle engages a corresponding foot which is provided on the grill.

method of use

Figure 30:
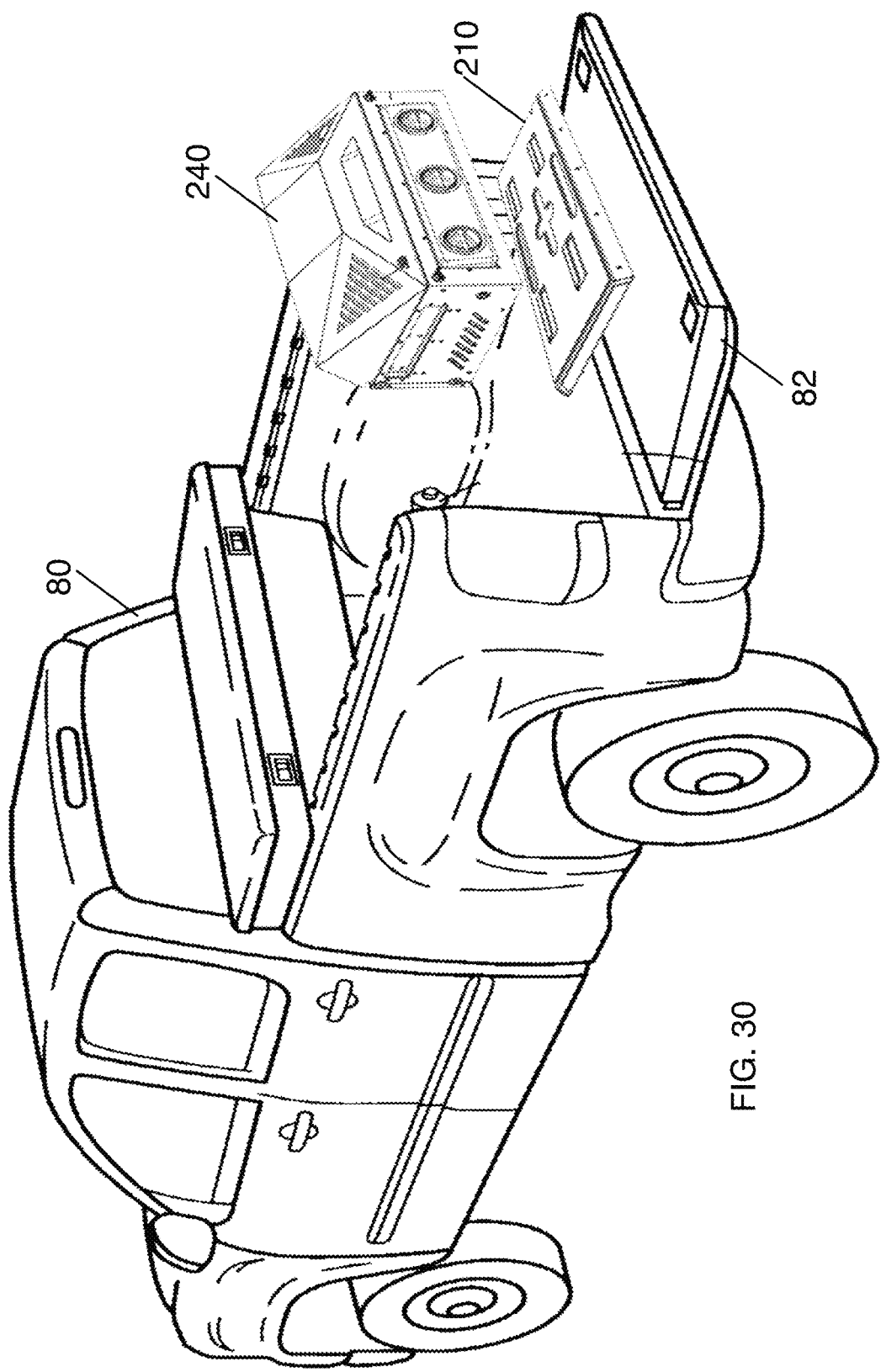
FIG. 30 is an exploded rear perspective view of a docking plate and grill main body positioned on the tailgate of a vehicle.
Figure 31:
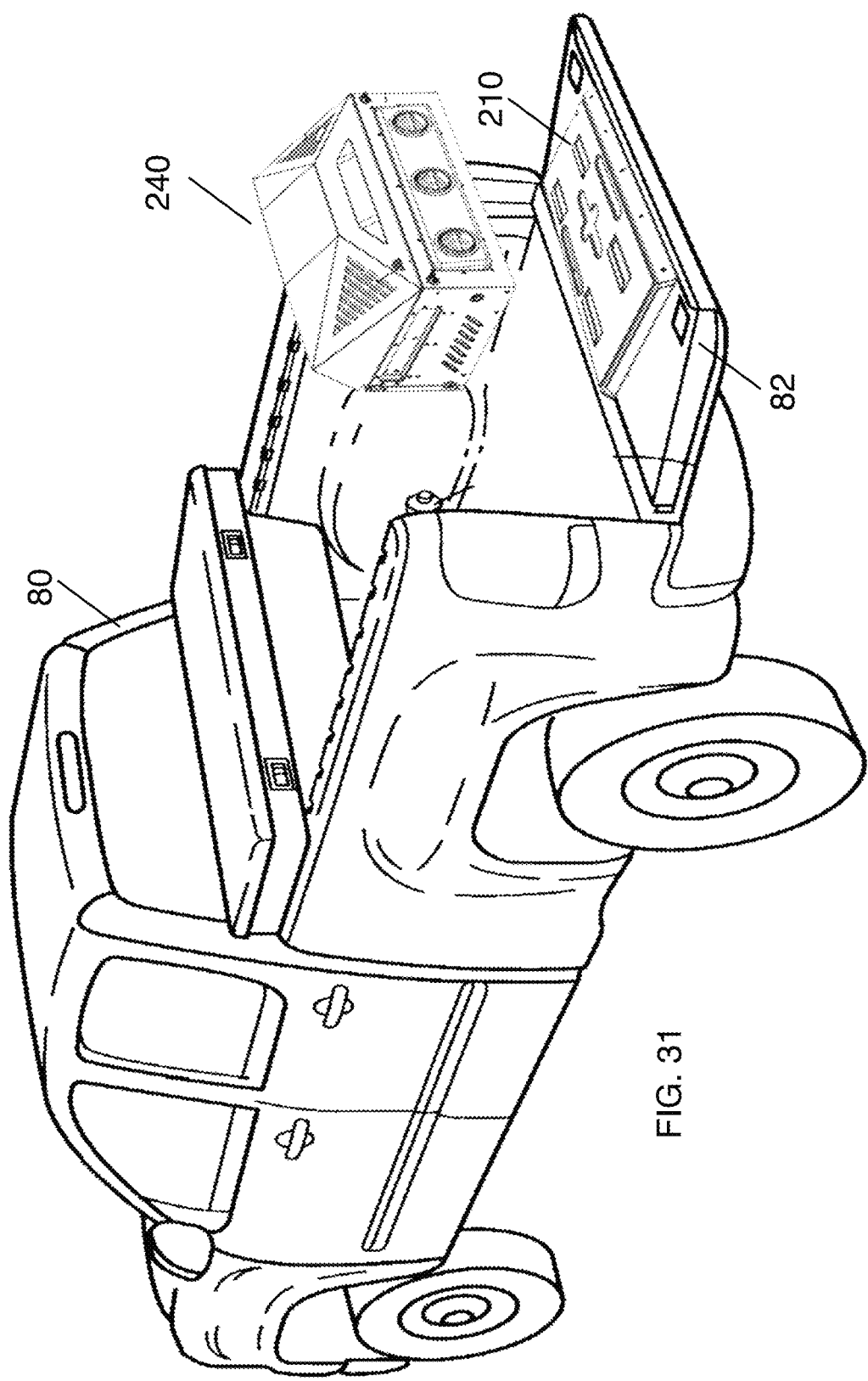
FIG. 31 is an exploded rear perspective view of the docking plate of FIG. 29A attached to the tailgate of the vehicle, and the grill main body.
Figure 32:
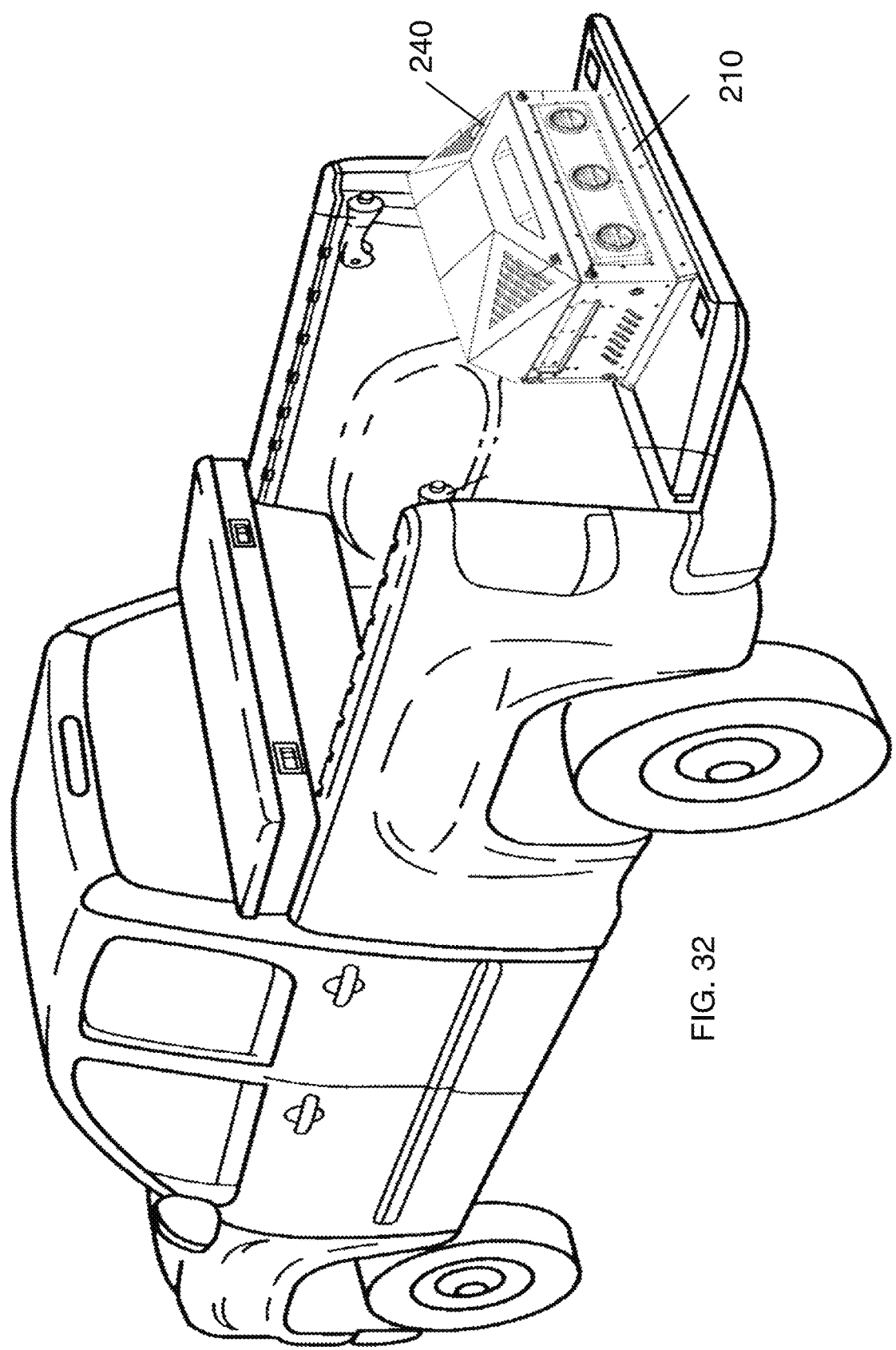
FIG. 32 is a rear perspective view of the docking plate of FIG. 29A attached to the tailgate of the vehicle, and the grill main body attached to the docking plate.

FIG. 30 is an exploded rear perspective view of a docking plate 210 and grill main body 240 positioned on the tailgate 82 of a vehicle 80. FIG. 31 is an exploded rear perspective view of the docking plate 210 of FIG. 29A attached to the tailgate 82 of the vehicle 80. The grill main body 240 is shown positioned above the docking plate. FIG. 32 is a rear perspective view of the docking plate 210 attached to the tailgate of the vehicle, and the grill main body 240 attached to the docking plate.

In one example method of use, the docking plate is attached to a vehicle tailgate, and the grill main body is removable attached to the docking plate. The tailgate is closed, and the vehicle is driven to a desired location. The tailgate is lowered and the grill is used. After use, the tailgate may be raised, and drippings are naturally drained to the large drip collection pan to prevent spillage. After transport, the grill main body may be removed and placed on a cart with a similar docking plate. In various examples, the grill main body may be used on the cart; the cart may be stored with the grill main body attached, or the cart and grill main body may be pushed to a backyard grill area where the grill main body may be transferred to a backyard grill.

FIG. 33 is a side view of a grill 101 positioned for support on a cart 550. In this example, the cart has a support surface 552 with a docking plate 560, a handle 554, rigid or collapsible supports 556, and a plurality of wheels 558. The grill 101 may be attached to the docking plate 560 so that the grill may be transported or used while supported by the cart.

FIG. 34A is a side view of a grill 101 positioned for support by a plurality of docking feet 345a, 345b, 345c, and 345d. FIG. 34B is a side view of a grill of FIG. 34A positioned on the plurality of docking feet.

It is to be understood that the specific embodiments and examples described above are by way of illustration, and not limitation. Various modifications may be made by one of ordinary skill, and the scope of the invention is as defined in the appended claims.

What is claimed is:

1. A vehicle-mounted barbecue grill comprising
   a grill docking plate assembly configured to be mounted on a tailgate of a vehicle, such that the tailgate can be oriented in a first vertical orientation and in a second horizontal orientation, and to remain attached to the tailgate when
      the tailgate is in the first vertical orientation, and
      when the tailgate is in a second horizontal orientation;
   a plurality of attachment elements configured to secure the docking plate assembly to a vehicle tailgate;
   a grill main body configured to be releasably mounted on the grill base plate, the grill main body comprising,
      a housing,
      a burner assembly comprising a plurality of gas burner elements, and a grating; and
   a lid assembly pivotally mounted on the grill main body, such that the grill docking plate assembly is configured to
      remain attached to the vehicle tailgate after the grill main body is detached from the grill base plate,
      a drip pan which is configured to collect drippings in a plurality of drip collection areas when the drip pan is in a horizontal orientation, and store the drippings in a drip reservoir when the drip pan is in a vertical orientation; and
      a drip pan handle.

2. The vehicle-mounted barbecue grill of claim 1 wherein the grill docking plate assembly further comprises
   a substantially horizontal base plate; and
   a plurality of offset features which support the horizontal base plate at a height of at least one half inch above the vehicle tailgate when the tailgate is in the second horizontal orientation.

3. The vehicle-mounted barbecue grill of claim 1 wherein the grill main body is rectangular and comprises
   a front surface,
   a rear surface,
   a left side surface, and
   a right side surface.

4. The vehicle-mounted barbecue grill of claim 1 wherein the drip reservoir has a greater cross sectional area than the drip collection areas.

5. The vehicle-mounted barbecue grill of claim 1 wherein the grill main body further comprises
   a drip pan access opening on the main body rear surface;
   a left rail or slide configured to support the drip pan; and
   a right rail or slide configured to support the drip pan.

6. The vehicle-mounted barbecue grill of claim 1 further comprising
   a drip pan lock configured to retain the drip pan substantially within the grill main body.

7. The vehicle-mounted barbecue grill of claim 1 wherein the grill main body further comprises a left side vent; and
   a right side vent.

8. The vehicle-mounted barbecue grill of claim 1 wherein the lid assembly further comprises
   a lid comprising a plurality of facets.

9. The vehicle-mounted barbecue grill of claim 1 wherein the lid assembly further comprises
   a right side adjustable vent; and
   a left side adjustable vent.

10. The vehicle-mounted barbecue grill of claim 1 wherein the lid assembly further comprises a pivot bar; and
    a plurality of hinges.

11. The vehicle-mounted barbecue grill of claim 1 wherein
    the grill docking plate assembly further comprises a plurality of slotted retention features; and the grill main body has a bottom and a plurality of feet, such that each foot is configured to engage one of the plurality of slotted retention features, each foot comprising
- a disk portion spaced apart from the bottom of the grill main body, and
- a spring-loaded pin.

12. The vehicle-mounted barbecue grill of claim 1 wherein the grill main body further comprises a burner cover assembly comprising
- a first slotted inverted-V-shaped portion configured to be placed over a first gas burner element;
- a second slotted inverted-V-shaped portion configured to be placed over a second gas burner element; and
- a third slotted inverted-V-shaped portion configured to be placed over a third gas burner element.

13. A portable barbecue grill system comprising
- a vehicle having a tailgate;
- a grill docking plate assembly configured to be mounted on the tailgate and to remain attached to the tailgate when the tailgate is in a first vertical orientation and when the tail-gate is in a second horizontal orientation;
- a plurality of attachment elements configured to secure the docking plate assembly to a vehicle tailgate;
- a grill main body configured to be releasably mounted on the grill base plate, the grill main body comprising,
  - a housing,
  - a burner assembly comprising a plurality of gas burner elements,
  - and a grating; and
- a lid assembly pivotally mounted on the grill main body, such that the grill docking plate assembly is configured to remain attached to the tailgate after the grill main body is detached from the grill base plate,
- a drip pan which is configured to collect drippings in a plurality of drip collection areas when the drip pan is in a horizontal orientation, and store the drippings in a drip reservoir when the drip pan is in a vertical orientation; and
- a drip pan handle.

14. The portable barbecue grill system of claim 13 further comprising a cart comprising
- a plurality of wheels; and
- a top surface comprising a docket plate configured to secure the grill main body.

\* \* \* \* \*